(12) United States Patent
Quirynen et al.

(10) Patent No.: US 10,409,233 B2
(45) Date of Patent: Sep. 10, 2019

(54) METHOD WITH QUASI-NEWTON JACOBIAN UPDATES FOR NONLINEAR PREDICTIVE CONTROL

(71) Applicant: Mitsubishi Electric Research Laboratories, Inc., Cambridge, MA (US)

(72) Inventors: Rien Quirynen, Boston, MA (US); Pedro Hespanhol, Berkeley, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 25 days.

(21) Appl. No.: 15/895,393

(22) Filed: Feb. 13, 2018

(65) Prior Publication Data
US 2019/0250571 A1    Aug. 15, 2019

(51) Int. Cl.
G05B 13/04    (2006.01)
G06F 17/16    (2006.01)
G06F 17/11    (2006.01)

(52) U.S. Cl.
CPC ............ *G05B 13/048* (2013.01); *G06F 17/11* (2013.01); *G06F 17/16* (2013.01)

(58) Field of Classification Search
CPC ........ G05B 13/048; G06F 17/11; G06F 17/16
(Continued)

(56) References Cited

U.S. PATENT DOCUMENTS 9,495,516 B2    11/2016    Hielscher et al.
2015/0161987 A1    6/2015    Horesh et al.

OTHER PUBLICATIONS

Magni (NPL: Nonlinear Model Predictive Control Towards New Challenging Applications, Year: 2009).*
(Continued)

*Primary Examiner* — Robert E Fennema
*Assistant Examiner* — Jigneshkumar C Patel
(74) *Attorney, Agent, or Firm* — Gennadiy Vinokur; Hironori Tsukamoto; James McAleenan

(57) ABSTRACT

A control system for controlling an operation of a system with continuous-time nonlinear dynamics subject to constraints including equality and inequality constraints on state and control variables of the system, including an estimator to estimate a current state of the system using measurements of the operation of the system and a controller to iteratively solve, at each control time step, an approximation of a constrained nonlinear optimization problem to produce a control solution, wherein the approximation includes a linearization of the nonlinear dynamics of the system discretized by time intervals in the control horizon and represented using an approximation of the constraint Jacobian matrix for each time interval of the control horizon. The iterative solution procedure is based on a block-wise update formula for the approximation of the constraint Jacobian matrix and the intermediate condensing matrices using an evaluation of one or combination of the discretized dynamics of the system and at least one directional derivative of the discretized dynamics of the system. Each block in the constraint Jacobian matrix and in the intermediate condensing matrices represents one time interval in the prediction horizon and can be updated independently, based on a block-wise rank-one update formula without any iterative solution procedure and without any matrix-matrix multiplications or matrix factorizations.

15 Claims, 27 Drawing Sheets

(58) Field of Classification Search
USPC .......................................................... 700/34
See application file for complete search history.

(56) References Cited

OTHER PUBLICATIONS

Asprion et al., "Partitioned Quasi-newton Approximation for Direct Collocation Methods and Its Application to the Fuel-optimal Control of a Diesel Engine" Journal of Applied Mathematics, vol. 2014, Article ID 341716, 6 pages. http://dx.doi.org/10.1155/2014/341716, Hindawi Publishing Corporation.
Gill et al., "Reduced-Hessian Quasi-Newton Methods for Unconstrained Optimization." 2001 Society for Industrial and Applied Mathematics, Siam J. Optim. vol. 12, No. 1, pp. 209-237.
Powell, "A Fast Algorithm for Nonlinearly Constrained Optimization Calculations." MJD Powell—Numerical analysis, pp. 144-157. 1978. Springer Berlin Heidelberg.
Janka et al., "An SR1/BFGS SQP algorithm for nonconvex nonlinear programs with block-diagonal Hessian matrix." Math. Prog. Comp. (2016) 8:435-459, DOI 10.1007/s12532-016-0101-2. Received: Jan. 23, 2015 / Accepted: Feb. 15, 2016 / Published online: Feb. 29, 2016 Springer-Verlag Berlin Heidelberg and The Mathematical Programming Society 2016.
Andreas Griewank , Andrea Walther & Maciek Korzec (2007) Maintaining factorized KKT systems subject to rank-one updates of Hessians and Jacobians, Optimization Methods and Software, 22:2, 279-295, DOI: 10.1080/10556780500487867.
Andreas Griewank & Andrea Walther (2002) On constrained optimization by adjoint based quasi-Newton methods, Optimization Methods and Software, 17:5, 869-889, DOI: 10.1080/1055678021000060829.
Griewank et al., "Local Convergence Analysis for Partitioned Quasi-Newton Updates," Numerische Mathematik, Springer Verlag 1982. Numer. Math 39, pp. 429-448 (1982).
Moritz Diehl, Andrea Walther, Hans Georg Bock & Ekaterina Kostina (2010): An adjoint-based SQP algorithm with quasi-Newton Jacobian updates for inequality constrained optimization, Optimization Methods and Software, 25:4, 531-552 to link to this article: http://dx.doi.org/10.1080/10556780903027500.
Conn et al., "Convergence of quasi-Newton matrices generated by the symmetric rank one update," Mathematical Programming 50 (1991) 177-195, North-Holland Received Jul. 23, 1987 Revised manuscript received Aug. 25, 1989.
Hans Georg Bock and Karl J. Plitt, "A multiple shooting algorithm for direct solution of optimal control problems," Preprints, International Federation of Automatic Control., 9th World Congress, a bridge between Control Science and Technology. vol. 4, Colloqua 14.2, 09.2. Budapest, Hungary, Jul. 2-6, 1984.
Gao et al., "Block BFGS Methods," (Submitted on Sep. 1, 2016 (v1), last revised Nov. 30, 2017 (this version, v3)). To appear in SIAM J. Optim. 28 pages, 4 figures, Optimization and Control (math.OC). https://arxiv.org/abs/1609.00318.

* cited by examiner

Given the optimal control structured nonlinear program (NLP)

$$\min_{X,U} \sum_{i=0}^{N-1} l_i(x_i, u_i) + l_N(x_N) \quad \text{— 351}$$

s.t. $x_0 - \hat{x}_0 = 0,$ — 352

$F_i(x_i, u_i) = x_{i+1}, \quad i = 0, \ldots, N-1,$ — 353

$p(x_i, u_i) \le 0, \quad i = 0, \ldots, N,$ — 354

600

Construct the local Quadratic Program (QP) approximation $$\min_{\Delta W} \sum_{i=0}^{N} \frac{1}{2} \Delta w_i^\top H_i \Delta w_i + h_i^\top \Delta w_i \quad \text{— 601}$$

s.t. $\Delta x_0 = \hat{x}_0 - \bar{x}_0,$ — 602

$a_i + A_i \Delta w_i = \Delta x_{i+1}, \quad i = 0, \ldots, N-1,$ — 603

$p(\Delta w_i) \le p_i, \quad i = 0, \ldots, N,$ — 604

Algorithm 1 Block-TR1 based Jacobian Updates within a Real-Time Iteration Scheme for Nonlinear MPC. ~ 710
~ 711

Input: $w_i^\circ = (x_i^\circ, u_i^\circ)$, $\lambda_i^\circ$ and $A_i^\circ$ for $i = 0, \ldots, N - 1$.

Problem linearization
1: Formulate the QP in (5) with matrices $A_i^\circ$ and evaluate ~ 605
    vectors $a_i$ and $h_i$ in (6) for $i = 0, \ldots, N - 1$.
    Computation of step direction
2: Obtain current state estimate $\hat{x}_0$.    ▷ from system ~ 121
3: Solve the QP subproblem in Eq. (5): ~ 406
    $w_i^+ \leftarrow w_i^\circ + \Delta w_i^\star$ and $\lambda_i^+ \leftarrow \lambda_i^\star$. ~ 712
4: Apply new control input $u_0^+$.    ▷ to system ~ 111
    Block-wise TR1 update
5: for $i = 0, \ldots, N - 1$ do in parallel
6:    $A_i^+ \leftarrow A_i^\circ + \alpha (y_i - A_i^\circ s_i)(\mu_i^\top - \sigma_i^\top A_i^\circ)$.
703 ~ 7: end for

Output: $w_i^+ = (x_i^+, u_i^+)$, $\lambda_i^+$ and $A_i^+$ for $i = 0, \ldots, N - 1$. ~ 713

FIG. 7C

Algorithm 2 Lifted Collocation with Block-TR1 Updates within a Real-Time Iteration Scheme for Nonlinear MPC. ~ 810

Input: $w_i^o = (x_i^o, u_i^o)$, $K_i^o$, $\lambda_i^o$, $\omega_i^o$, $C_i^o$, $D_i^o$, $C_i^{o-1}$ and $E_i^o$. ~ 811

Problem linearization
1: Formulate the QP in (15) with matrices $E_i^o$ and evaluate vectors $d_i$ and $h_i^c$ in (16) for $i = 0, \ldots, N-1$. ~ 615

Computation of step direction
2: Obtain current state estimate $\hat{x}_0$.   ▷ from system ~ 121
3: Solve the QP subproblem in Eq. (15): ~ 406
   $w_i^+ \leftarrow w_i^o + \Delta w_i^\star$ and $\lambda_i^+ \leftarrow \lambda_i^\star$. ~ 712
4: Apply new control input $u_0^+$.   ▷ to system ~ 111

Block-wise TR1 update
5: for $i = 0, \ldots, N-1$ do in parallel ~ 808
6: $\quad K_i^+ \leftarrow K_i^o - C_i^{o-1} c_a - E_i^o \Delta w_i^\star$,
7: $\quad \omega_i^+ \leftarrow C_i^{-\top} \frac{\partial G_i}{\partial K_i}^\top \omega_i^o - \omega_i^o - C_i^{-\top} B_i^\top \lambda_i^+$, ~ 809
8: $\quad D_i^+ \leftarrow D_i^o + \alpha UV_D^\top$ and $C_i^+ \leftarrow C_i^o + \alpha UV_C^\top$. ~ 806
9: $\quad C_i^{+-1} \leftarrow C_i^{o-1} - \alpha \beta UV_C^\top C_i^{o-1}$, ~ 807
10: $\quad E_i^+ \leftarrow E_i^o + \alpha UV^\top$.
11: end for ~ 803

Output: $w_i^+$, $K_i^+$, $\lambda_i^+$, $\omega_i^+$, $C_i^+$, $D_i^+$, $C_i^{+-1}$ and $E_i^+$. ~ 813

Given a rank-one update to the constraint Jacobian matrix $$E^+ = E^o + \alpha u v^T$$

Compute the symmetric rank-two update to the condensed Hessian matrix $H_c = E^T H E$ $$H_c^+ = H_c^o + \alpha v (\tilde{u}^T + \beta v^T) + \alpha \tilde{u} v^T$$

METHOD WITH QUASI-NEWTON JACOBIAN UPDATES FOR NONLINEAR PREDICTIVE CONTROL

TECHNICAL FIELD

The invention relates generally to predictive control of nonlinear dynamical systems, and more particularly to a method and apparatus for block-structured low-rank Jacobian updates in a quasi-Newton type optimization algorithm for real-time predictive control of nonlinear systems.

BACKGROUND

A predictive controller, such as model predictive control (MPC), is used in many applications to control complex dynamical systems that are described by a set of nonlinear differential equations, i.e., a system of ordinary differential equations (ODE) or differential-algebraic equations (DAE). Examples of such systems include production lines, vehicles, satellites, engines, robots, power generators and other numerically controlled machines.

Direct optimal control methods rely on the discretization of the continuous-time differential equations, based on a discretization of the control horizon and a corresponding parameterization of the control action over the prediction horizon. The resulting nonlinear optimization problem or nonlinear program (NLP) can be solved by any nonlinear optimization solver. However, in the case of real-time applications of predictive control for nonlinear systems, this nonlinear optimization problem needs to be solved under strict timing constraints.

Predictive control for a system described by nonlinear differential equations, requires the solution of a nonlinear optimal control problem at each control step. Instead of solving each problem exactly, one real-time iteration of a sequential quadratic programming (SQP) method can be performed in order to update a solution guess from one time point to the next. Such a Newton-type SQP method requires a linearization of the discretized nonlinear dynamics at each iteration of the method. This linearization can be costly and requires a Jacobian evaluation when using an explicit integration method and it can additionally require matrix factorizations, matrix-matrix multiplications and/or an iterative procedure to solve a nonlinear system of equations in case of an implicit integration method.

Accordingly, there is a need to reduce the computational cost of SQP solvers in real-time predictive control applications for nonlinear dynamical systems.

SUMMARY

It is an object of some embodiments to provide a control system and a method for controlling a system by solving an inequality constrained nonlinear dynamic optimization problem, including a discretization of the nonlinear differential equations that describe the dynamic model of the system.

Some embodiments use a real-time iteration method for solving the nonlinear optimal control problem (OCP) by performing, at each control step in a predictive controller, one iteration of a sequential quadratic programming (SQP) method. This means that, at each control step, an embodiment needs to prepare and solve a quadratic program (QP) approximation of the nonlinear optimization problem. The QP preparation includes the linearization of the nonlinear constraints that impose the discretized nonlinear system dynamics. Based on this linearization, the resulting QP is solved in order to produce the control solution that is used to control the system at each step of the predictive controller.

When the dynamic model of the system is described by a set of continuous-time differential equations, some embodiments discretize the system dynamics using a numerical integration method and the linearization requires a corresponding Jacobian evaluation. Some embodiments are based on the realization that this linearization step, which is necessary to prepare the QP approximation of the nonlinear optimization problem, forms a computationally expensive step in case the dynamics are highly dimensional, in case they involve lengthy nonlinear expressions or if they are described by a set of stiff or implicitly defined differential equations.

Some embodiments use an implicit integration scheme to discretize the nonlinear system dynamics, e.g., in direct collocation, because of their desirable numerical stability properties and their capability to deal with implicit algebraic equations. Such an implicit integration scheme requires the solution of a nonlinear system of equations that implicitly defines intermediate variables to represent the discretized system dynamics. Some embodiments are based on the realization that, in an SQP method, these intermediate variables can be eliminated numerically from each QP approximation in order to result in a QP of smaller dimensions that can be solved more efficiently. This numerical elimination procedure can be referred to as condensing and computes the constraint Jacobian matrix in the condensed QP, based on the computation of multiple intermediate condensing matrices.

Each linearization of the discretized system dynamics can benefit from the re-computation of these condensing matrices in order to produce the exact constraint Jacobian matrix in the condensed QP approximation of the nonlinear OCP. Instead of using the exact Jacobian matrix for the discretized system dynamics at each control step, some embodiments use a Jacobian approximation in combination with an adjoint-based inexact SQP iteration. Some embodiments are based on the realization that these Jacobian approximations can then be updated from one time point to the next, using a rank-one update based on quasi-Newton and/or Broyden type methods. Such an approach is based only on evaluations of the discretized system dynamics and/or on adjoint differentiation techniques which are computationally much cheaper than a complete Jacobian evaluation.

Some embodiments are based on the recognition that updating the Jacobian matrices may reduce the computational complexity but also may come short to achieve the computational complexity suitable for real-time control applications. Some embodiments are based on the understanding of two reasons for such a shortcoming. First, the update of the Jacobian matrices may destroy its sparsity. Some embodiments are based on the recognition that, when applying a classical quasi-Newton or Broyden type method to the discretized system dynamics, one obtains a dense Jacobian approximation and the block-structured sparsity structure is therefore destroyed. In those situations, the solution of the QP approximation with non-sparse Jacobian matrices is computationally demanding.

Because of the multi-stage structure of the OCP with a linear coupling from one time interval to the next in the control horizon, it is however realized that the exact Jacobian instead exhibits a particular block sparsity structure. Some embodiments therefore alternatively apply the quasi-Newton or Broyden type update formula in a way to preserve this block sparsity structure of the Jacobian, resulting in a block-wise rank-one update of the Jacobian. This block-wise rank-one update has the same computational cost as a standard rank-one update, which is considerably lower than a complete Jacobian evaluation, but preserves the block-structured sparsity of the problem which is beneficial for an efficient solution of the QP approximation of the nonlinear optimization problem.

The second reason of the high computational cost of updating the Jacobian approximations lies in the computational complexity of performing the update of the Jacobian matrix in the case of using an implicit integration method to discretize the continuous-time system dynamics. Some embodiments are based on the realization that an iterative solution procedure is needed to compute the intermediate variables of the implicit integration method in each update of the constraint Jacobian matrix. Specifically, some embodiments instead use the block-wise rank-one update formula to produce a Jacobian approximation for the combined system, that includes the discretized system dynamics and the nonlinear system of equations that define the intermediate variables.

Some embodiments are based on the realization that this block-wise rank-one update for the Jacobian of the combined system of equations leads to a rank-one update formula for the intermediate condensing matrices, by using the Sherman-Morrison formula that shows how the rank-one update of a matrix leads to a rank-one update of the inverse of that matrix. The block-wise rank-one update of the intermediate condensing matrices then leads to a rank-one update of the condensed constraint Jacobian matrices in the block-structured QP approximation. These embodiments perform the numerical elimination or condensing of the implicitly defined intermediate variables, based on this block-wise rank-one update formula, without any iterative solution procedure and without any matrix-matrix multiplications or matrix factorizations. Instead, these embodiments only require matrix-vector operations and one evaluation of the nonlinear equations and one evaluation of an adjoint directional derivative.

Some embodiments are based on the factorization of the condensed Hessian matrix in order to solve the QP approximation of the nonlinear OCP at each control step, which is a costly computational step. Some embodiments are based on the realization that this matrix factorization can be updated from one control step to the next, based on the rank-one update of the constraint Jacobian matrix. Specifically, some embodiments use a rank-two symmetric update formula to update the factorization of the condensed Hessian matrix based on the rank-one update to the constraint Jacobian matrix. Some other embodiments use a rank-three symmetric update formula to update the factorization of the condensed Hessian matrix based on the rank-one update to the constraint Jacobian matrix and a quasi-Newton type rank-one update formula for the Hessian approximation.

Accordingly, one embodiment discloses a control system for controlling an operation of a system with continuous-time nonlinear dynamics subject to constraints including equality and inequality constraints on state and control variables of the system. The control system includes an estimator to estimate a current state of the system using measurements of the operation of the system; a memory to store intermediate condensing matrices and an approximation of a constraint Jacobian matrix determined for each time interval in a control horizon, such that the intermediate condensing matrices and the approximation of the constraint Jacobian matrix have a block-bidiagonal structure; a processor to iteratively solve, at each control step, an approximation of a constrained nonlinear optimization problem to produce a control solution, wherein the approximation includes a linearization of the nonlinear dynamics of the system discretized by time intervals in the control horizon and represented using the approximation of the constraint Jacobian matrix for each time interval of the control horizon, wherein, at each control step, the processor is configured to retrieve, from the memory, the intermediate condensing matrices and the approximation of the constraint Jacobian matrix determined for each time interval; block-wise update the approximation of the constraint Jacobian matrix and the intermediate condensing matrices using an evaluation of one or combination of the discretized dynamics of the system and a directional derivative of the discretized dynamics of the system, wherein each block in the constraint Jacobian matrix and the intermediate condensing matrices represents one time interval in the control horizon; solve the approximation of the nonlinear optimization problem using the updated approximation of the constraint Jacobian matrix; and update the memory with the updated approximation of the constraint Jacobian matrix and the updated intermediate condensing matrices; and a controller to control the system using the control solution.

Another embodiment discloses a method for controlling an operation of a system with continuous-time nonlinear dynamics subject to constraints including equality and inequality constraints on state and control variables of the system, wherein the method uses a processor coupled to a memory storing intermediate condensing matrices and an approximation of a constraint Jacobian matrix determined for each time interval in a control horizon, such that the intermediate condensing matrices and the approximation of the constraint Jacobian matrix have a block-bidiagonal structure, wherein the processor is coupled with stored instructions implementing the method, wherein the instructions, when executed by the processor carry out at least some steps of the method, includes estimating a current state of the system using measurements of the operation of the system; iteratively solving, at each control step, an approximation of a constrained nonlinear optimization problem to produce a control solution, wherein the approximation includes a linearization of the nonlinear dynamics of the system discretized by time intervals in the control horizon and represented using the approximation of the constraint Jacobian matrix for each time interval of the control horizon, wherein, an iteration of the solving comprises retrieving, from the memory, the intermediate condensing matrices and the approximation of the constraint Jacobian matrix determined for each time interval; block-wise updating the approximation of the constraint Jacobian matrix and the intermediate condensing matrices using an evaluation of one or combination of the discretized dynamics of the system and a directional derivative of the discretized dynamics of the system, wherein each block in the constraint Jacobian matrix and the intermediate condensing matrices represents one time interval in the control horizon; solving the approximation of the nonlinear optimization problem using the updated approximation of the constraint Jacobian matrix; and updating the memory with the updated approximation of the constraint Jacobian matrix and the updated intermediate condensing matrices; and controlling the system using the control solution.

Yet another embodiment discloses a non-transitory computer readable storage medium embodied thereon a program executable by a processor for performing a method, the method includes estimating a current state of the system using measurements of the operation of the system; iteratively solving, at each control step, an approximation of a constrained nonlinear optimization problem to produce a control solution, wherein the approximation includes a linearization of the nonlinear dynamics of the system discretized by time intervals in the control horizon and represented using the approximation of the constraint Jacobian matrix for each time interval of the control horizon, wherein, an iteration of the solving comprises retrieving intermediate condensing matrices and an approximation of a constraint Jacobian matrix determined for each time interval in a control horizon, such that the intermediate condensing matrices and the approximation of the constraint Jacobian matrix have a block-bidiagonal structure; block-wise updating the approximation of the constraint Jacobian matrix and the intermediate condensing matrices using an evaluation of one or combination of the discretized dynamics of the system and a directional derivative of the discretized dynamics of the system, wherein each block in the constraint Jacobian matrix and the intermediate condensing matrices represents one time interval in the control horizon; and solving the approximation of the nonlinear optimization problem using the updated approximation of the constraint Jacobian matrix; and controlling the system using the control solution.

BRIEF DESCRIPTION OF THE DRAWINGS

FIG. 6A is a block diagram of a local approximation of the optimal control structured NLP via a local Quadratic Program (QP) approximation, based on an explicit formulation of the discrete time system dynamics;

FIG. 7C is a pseudo code of a real-time implementation of a nonlinear MPC controller, based on an explicit formulation of the discrete time system dynamics, via successive local QP approximations and a block-structured quasi-Newton type update scheme for the constraint Jacobian matrices;

FIG. 8C is a pseudo code of a real-time implementation of a nonlinear MPC controller, based on an implicit formulation of the discrete time system dynamics, via successive local QP approximations and a block-structured quasi-Newton type update scheme for the intermediate condensing and constraint Jacobian matrices;

FIG. 11A is a block diagram of a symmetric rank-two update of the condensed Hessian matrix, given a rank-one update to the constraint Jacobian matrix;

DETAILED DESCRIPTION

Some embodiments of the invention provide a system and a method for controlling an operation of a system or a system using a predictive controller. An example of the predictive controller is a model predictive control (MPC) determining control inputs based on a model of the controlled system. This predictive controller is based on nonlinear model predictive control (NMPC), when the control inputs are determined using a nonlinear model of the controlled system.

Figure 1:
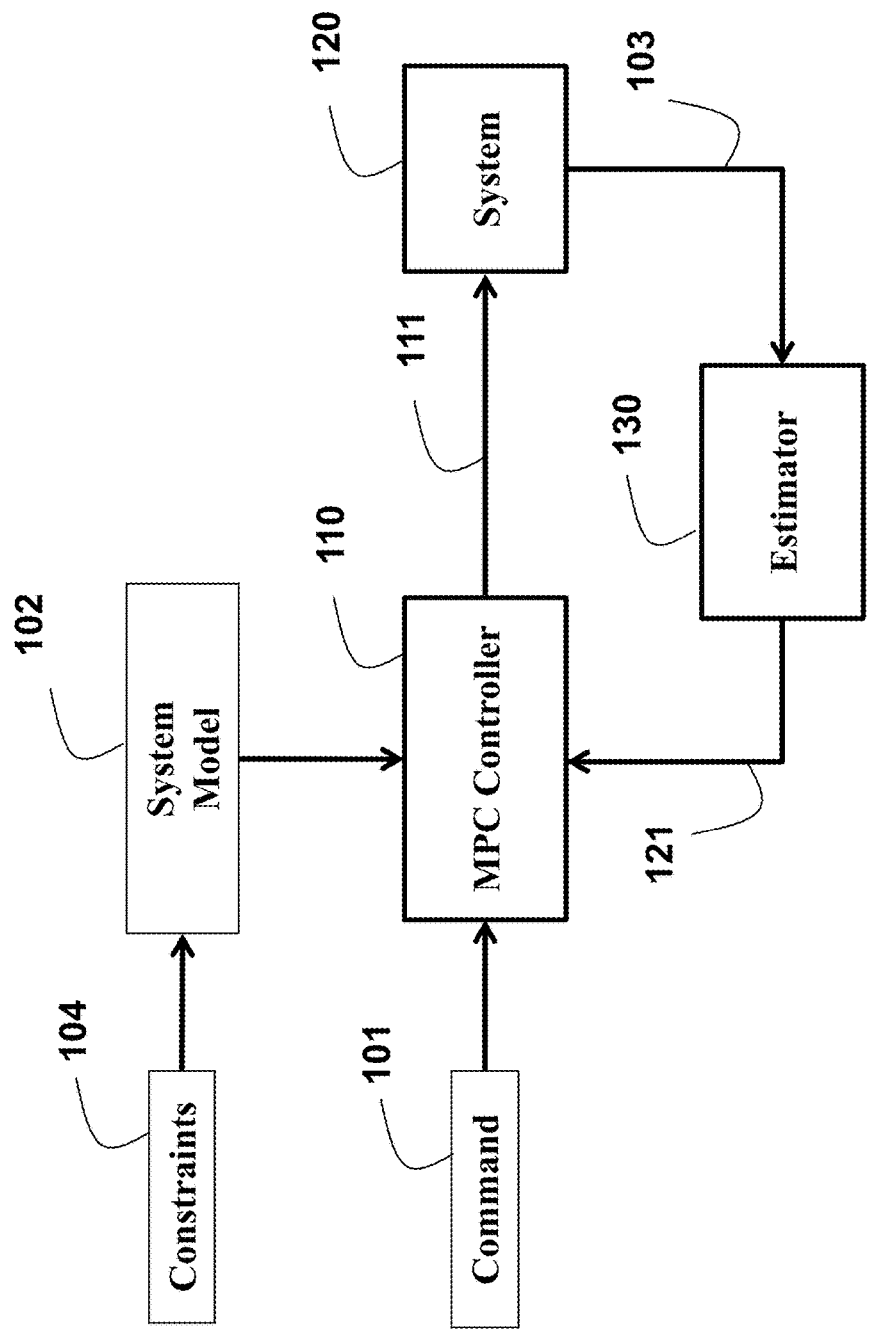
FIG. 1 is a block diagram of a controller and feedback system according to some embodiments.

FIG. 1 shows an example system 120 connected to a control system, such as a predictive controller 110, via a state estimator 130. In some implementations, the predictive controller is an MPC controller programmed according to a dynamical model 102 of the system. The model can be a set of equations representing changes of the state and output 103 of the system 120 over time as functions of current and previous inputs 111 and previous outputs 103. The model can include constraints 104 that represent physical and operational limitations of the system. During the operation, the controller receives a command 101 indicating the desired behavior of the system. The command can be, for example, a motion command. In response to receiving the command 101, the controller generates a control signal 111 that serves as an input for the system. In response to the input, the system updates the output 103 of the system. Based on measurements of the output of the system 103, the estimator updates the estimated state of the system 121. This estimated state of the system 121 provides the state feedback to the predictive controller 110.

The system 120, as referred herein, can be any machine or device controlled by certain control signals 111 (inputs), possibly associated to physical quantities such as voltages, pressures, forces, torques, and to return some controlled output signals 103 (outputs), possibly associated to physical quantities such as currents, flows, velocities, positions indicative of a transition of a state of the system from a previous state to the current state. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

A model of the system 102 can include a set of mathematical equations that describe how the system outputs change over time as functions of current and previous inputs, and the previous outputs. The state of the system is any set of information, in general time varying, for instance an appropriate subset of current and previous inputs and outputs, that, together with the model of the system and future inputs, can uniquely define the future motion of the system.

The system can be subject to physical limitations and specification constraints 104 limiting the range where the outputs, the inputs, and also possibly the states of the system are allowed to operate.

The predictive controller 10 can be implemented in hardware or as a software program executed in a processor, e.g., a microprocessor, which at fixed or variable control period sampling intervals receives the estimated state of the system 121 and the desired motion command 101 and determines, using this information, the inputs, e.g., the control signal 111, for operating the system.

The estimator 130 can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the system 120.

Figure 2:
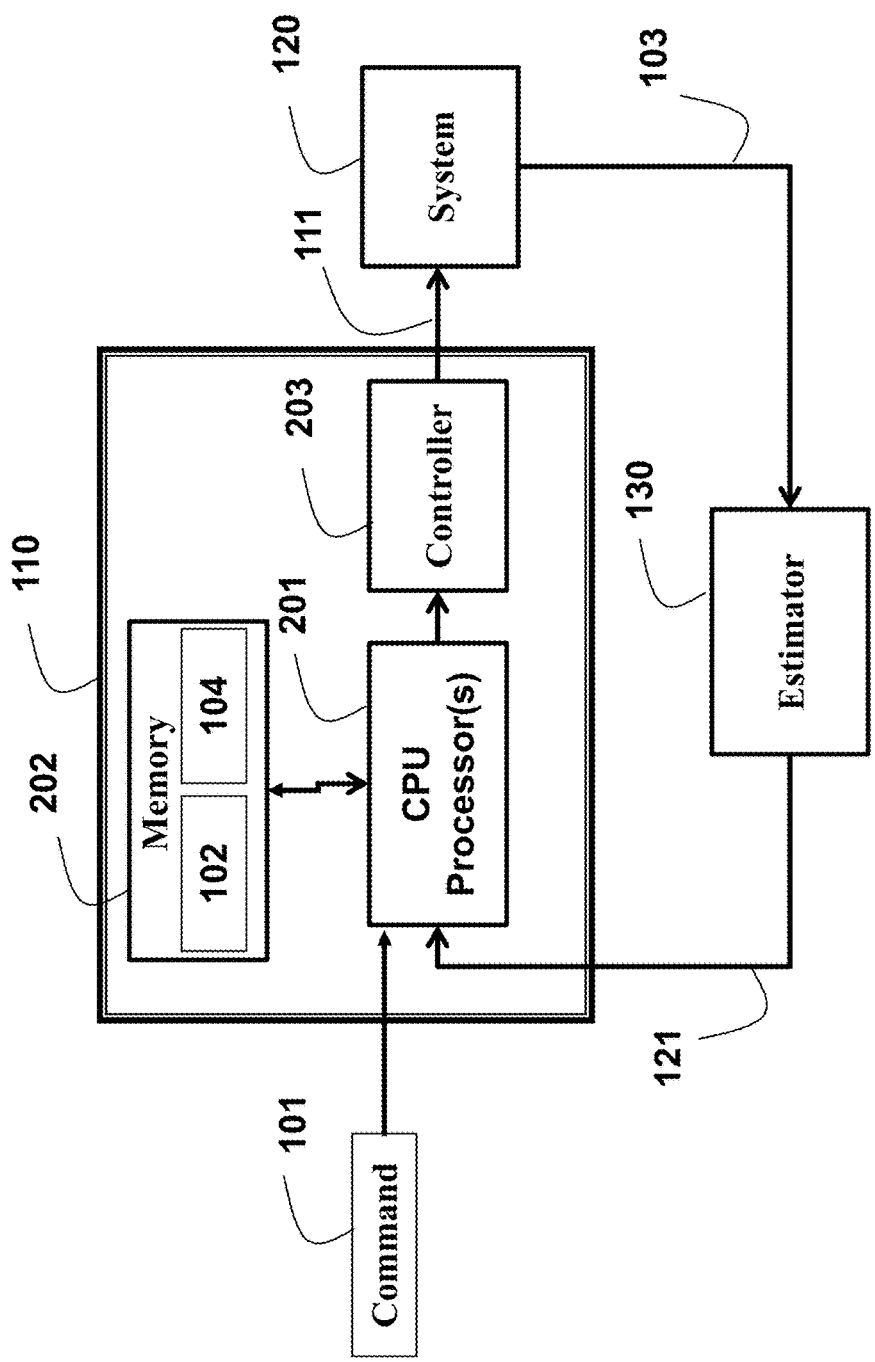
FIG. 2 is a block diagram of a controller, implemented using CPU processors and memory, and feedback system according to some embodiments of the invention.

FIG. 2 shows a block diagram of the predictive controller 110, according to some embodiments, which actuates the system such that the estimated state 121 of the system and output 103 follow a command 101. The controller 110 includes a computer, e.g., in the form of a single central processing unit (CPU) or multiple CPU processors 201 connected to memory 202 for storing the model 102 and the constraints 104 on the operation of the system.

In some embodiments, the processor 201 is connected to a controller 203 configured to control the system using the control solution determined by the processor 201. For example, the processor 201 can implement a functionality of the controller 203. For example, the controller 203 determines the control signal 111 based on the control solution determined by the processor 201 and submits the control signals to the system 102. For example, the controller 203 can transformed the control solution determined by the processor into signals 111 associated with physical quantities of a specific system 120, such as voltages, pressures, forces, and torques.

Figure 3A:
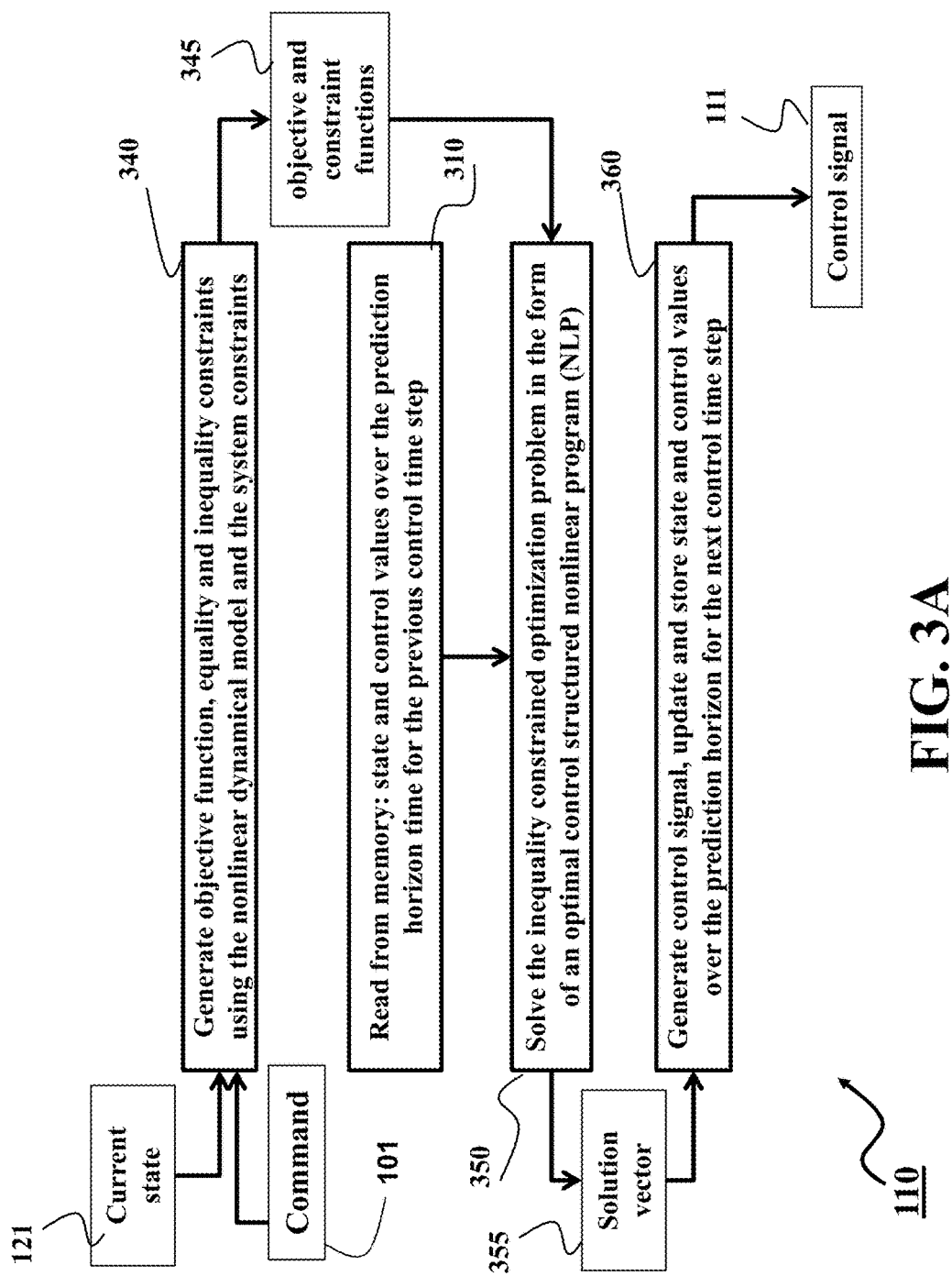
FIG. 3A is a block diagram of a nonlinear model predictive control (MPC) method to implement the controller according to some embodiments.

FIG. 3A shows a block diagram of a system and a method for model predictive control (MPC) to implement the controller 110 that computes the control signal 111, given the current state of the system 121 and the control command 101 according to some embodiments. Specifically, MPC computes a control solution, e.g., a solution vector 355, that contains a sequence of future optimal control inputs over a prediction time horizon of the system 360, by solving an inequality constrained optimization problem 350 at each control time step. The data 345 of the objective function, equality and inequality constraints in this optimization problem 350 depends on the dynamical model, the system constraints 340, the current state of the system 121 and the control command 101.

In general, the inequality constrained optimization problem 350 is an optimal control structured nonlinear program (NLP), in which either the objective function, certain equality or inequality constraints or a combination of these objective and constraint functions 345 are nonlinear and nonconvex. For example, in some embodiments, the system model 102 that is used by MPC, is a set of nonlinear dynamical equations 340 such that the predictive controller 110 is based on nonlinear model predictive control (NMPC).

In some embodiments, the solution of this inequality constrained optimization problem 350 uses the state and control values over the prediction time horizon from the previous control time step 310, which can be read from the memory. This concept is called warm- or hot-starting of the optimization algorithm and can reduce the required computational effort of the MPC controller in some embodiments. In a similar fashion, the corresponding solution vector 355 can be used to update and store a sequence of optimal state and control values for the next control time step 360.

Figure 3B:
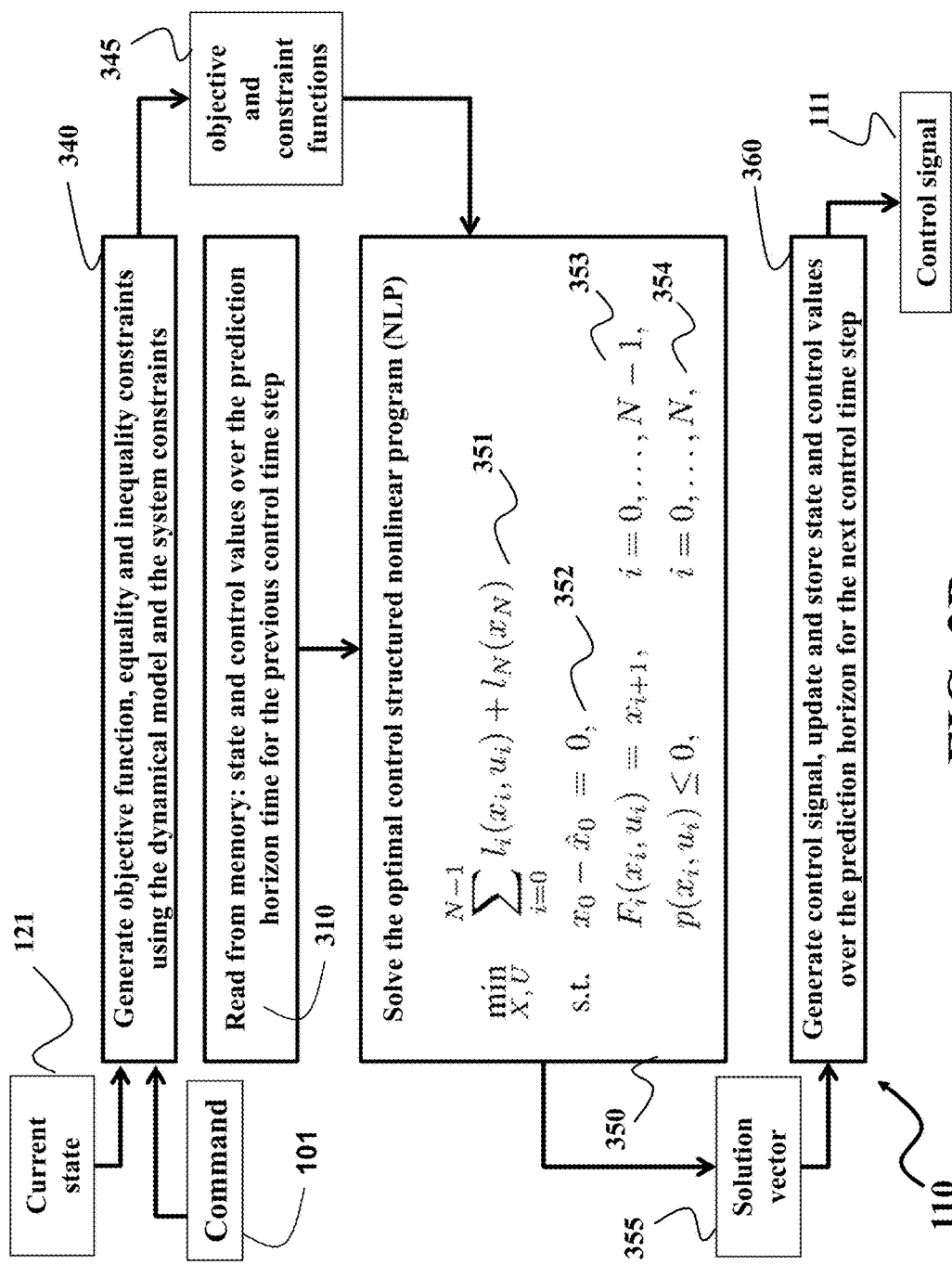
FIG. 3B is a block diagram of an MPC method that solves an optimal control structured Nonlinear Program (NLP), based on an explicit formulation of the discrete time system dynamics, according to some embodiments.

FIG. 3B shows a block diagram of a nonlinear MPC controller, that computes a control signal 111 given the current state of the system 121 and the control command 101, by solving an optimal control structured nonlinear program (NLP) 350 at each control time step, based on an explicit formulation of the discrete time system dynamics 353. The dynamical model formulation of the system is explicit, because the state value $x_{i+1}$ at a certain time point $t_{i+1}$ is defined explicitly by the state value $x_i$ and the control input $u_i$ at the previous time point $t_i$ via an explicit function $x_{i+1}=F_i(x_i,u_i)$. As discussed also further, in some embodiments, this explicit formulation of the discrete time system dynamics 353 is obtained by applying one or multiple steps of an explicit integration scheme to a set of continuous time differential equations.

In addition to the equality constraints that impose the nonlinear dynamics of the system 353, there is also the initial value constraint 352 that imposes the initial state value $x_0$ to be equal to the current state estimate 121 of the system $\hat{x}_0$ and the inequality constraints 354 that impose any additional system constraints, representing physical and operational limitations of the system. The objective function 351 of the optimal control problem can include a cost term corresponding to each of the time points of the prediction time horizon. In some embodiments, the objective function includes a (nonlinear) least squares type penalization of the deviation of a certain output function of the system from a sequence of reference output values at each of the time points of the prediction time horizon.

Figure 3C:
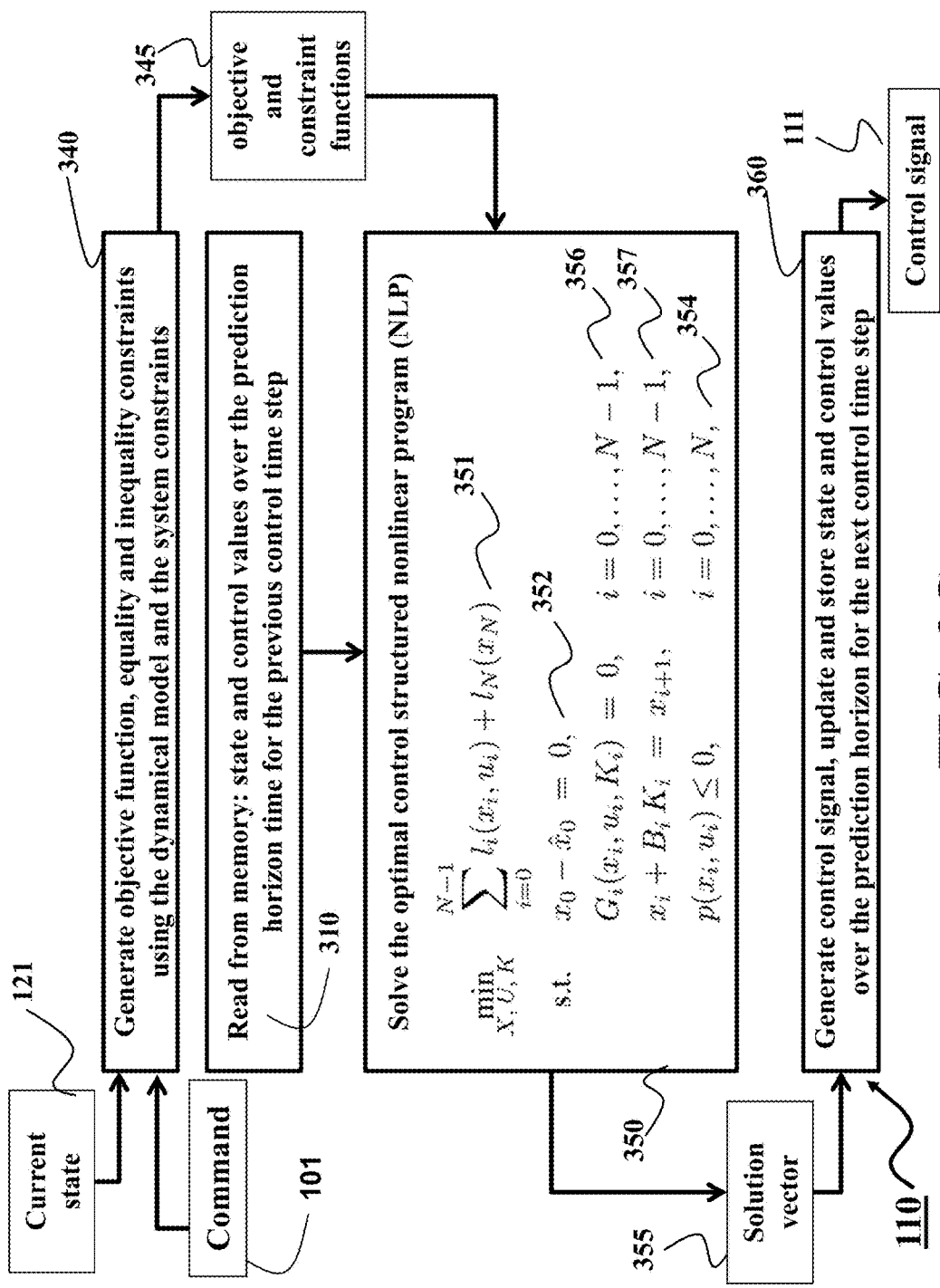
FIG. 3C is a block diagram of an MPC method that solves an optimal control structured Nonlinear Program (NLP), based on an implicit formulation of the discrete time system dynamics, according to some embodiments.

FIG. 3C shows a block diagram of a nonlinear MPC controller, that computes a control signal 111 given the current state of the system 121 and the control command 101, by solving an optimal control structured nonlinear program (NLP) 350 at each control time step, based on an implicit formulation of the discrete time system dynamics 356-357. The dynamical model formulation of the system is implicit, because the state value $x_{i+1}$ at a certain time point $t_{i+1}$ is defined by the state value $x_i$, the control input $u_i$ and a set of additional intermediate variables $K_i$ at the previous time point $t_i$ 357. These intermediate variables $K_i$ are defined implicitly by the set of nonlinear equations $0=G_i(x_i,u_i,K_i)$ 356, i.e., the Jacobian of these equations with respect to the intermediate variables $$\frac{\partial G_i}{\partial K_i}(\cdot)$$

is a square matrix that must be nonsingular in general. As discussed also further, in some embodiments, this implicit formulation of the discrete time system dynamics 356-357 is obtained by applying one or multiple steps of an implicit integration scheme to a set of continuous time differential equations.

Figure 4A:
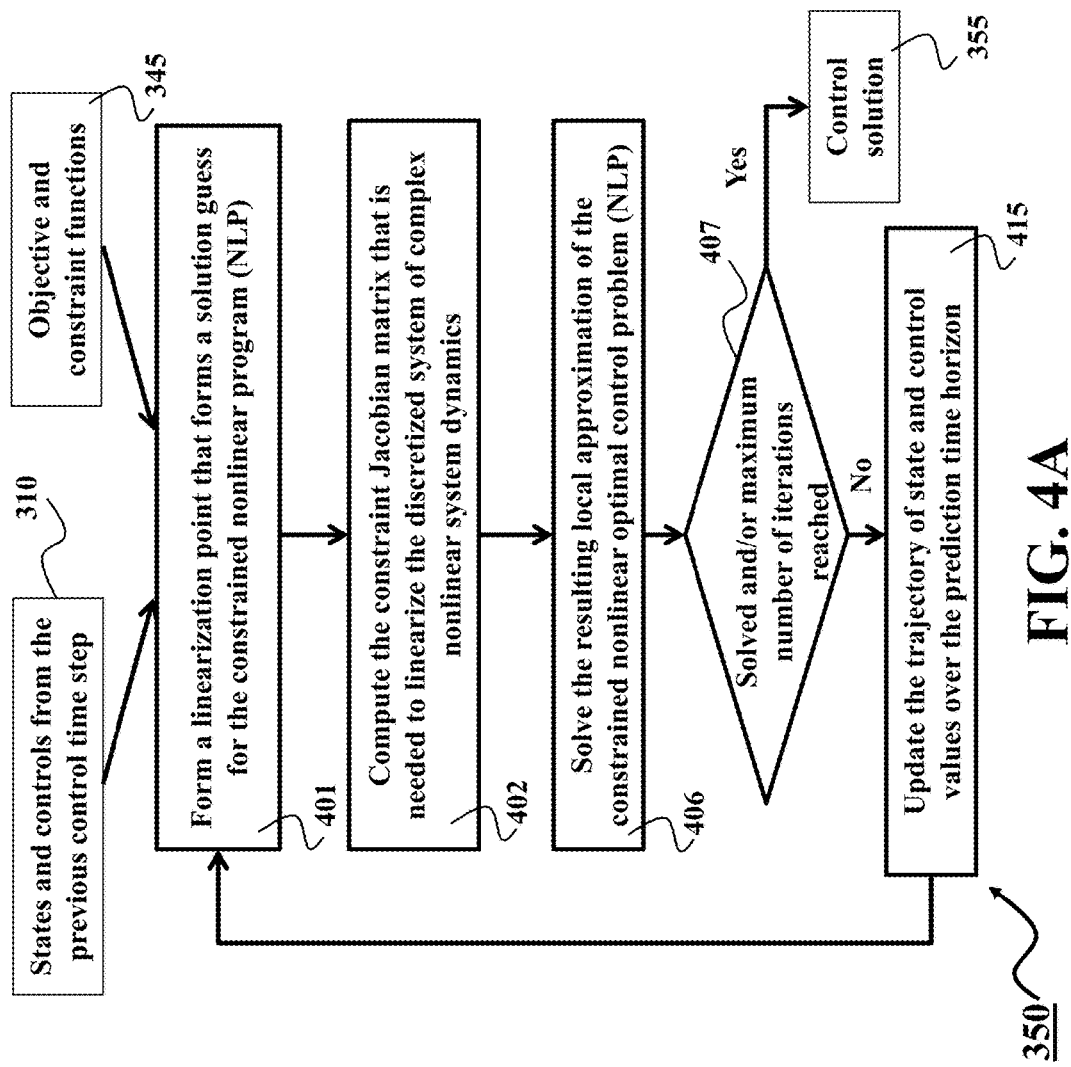
FIG. 4A is a block diagram of an iterative procedure to solve the constrained NLP at each control time step via the use of successive local approximations.

FIG. 4A shows a block diagram of an iterative procedure to solve the constrained, optimal control structured, nonlinear program (NLP) 350 at each control time step via the use of successive local approximations 406. A solution guess for the NLP 401 is used to construct this local approximation and its solution is used to update the current sequence of state and control values over the prediction time horizon 415, resulting in an update to the current solution guess for the constrained NLP 401 at each iteration of the algorithmic procedure. The state and control values from the previous control time step 310 can be used to form an initial solution guess for the constrained NLP 401.

Based on the nonlinear objective and constraint functions 345 and using the current solution guess as a linearization point 401, a local approximation to the NLP 406 is constructed at each iteration of the algorithmic procedure. For this purpose, the constraint Jacobian matrix needs to be computed or approximated in order to form a linearization of the discretized system of complex nonlinear dynamics 402. In the case that the solution of the local approximation forms a sufficiently accurate solution for the NLP 407, then the optimal control solution 355 is obtained. A slightly suboptimal and/or infeasible solution 355 is obtained when the maximum number of iterations is reached 407 instead. In the case where a solution to the NLP with sufficient accuracy is not yet found and the maximum number of iterations is not yet reached 407, then the solution to the local approximation 406 is used to update the current values for the state and control values over the prediction time horizon 415 and the current solution guess to the NLP 401.

Different types of optimization algorithms can be used to solve the inequality constrained, optimal control structured, nonlinear program (NLP) 350 at each control time step via the use of successive local approximations 406. Some embodiments are based on Sequential Quadratic Programming (SQP), in which a Quadratic Program (QP) is constructed and solved in each iteration as a local approximation to the original NLP. Instead, some embodiments are based on an interior point (IP) method where each local approximation is a linearization of the first order necessary conditions of optimality for the NLP in which the complementarity conditions, corresponding to the inequality constraints, are generally smoothened. In some embodiments, a barrier function is used to iteratively enforce the inequality constraints and each iteration constructs and solves a local approximation to the barrier reformulated problem.

Each of the above mentioned optimization methods can use different Newton-type approximation techniques for the constraint Jacobian and Hessian matrices when constructing and solving the local subproblem in each iteration 406. Some embodiments are based on the exact linearization of some or all of the constraint functions by computing the exact constraint Jacobian matrix. Some embodiments instead use a quasi-Newton type update formula to iteratively update an approximation to the constraint Jacobian matrix via low-rank update techniques. Similarly, for the Lagrangian Hessian matrix of the NLP, also different Newton-type approximation techniques can be used. Some embodiments are based on an evaluation of the exact Hessian matrix for the Lagrangian when constructing each local approximation to the NLP. Some embodiments instead use a quasi-Newton type update formula to iteratively update an approximation to the Hessian matrix via symmetric low-rank update techniques. In case the objective function of the NLP includes a (nonlinear) least squares type cost term, some embodiments are based on a Gauss-Newton type Hessian approximation instead.

Figure 4B:
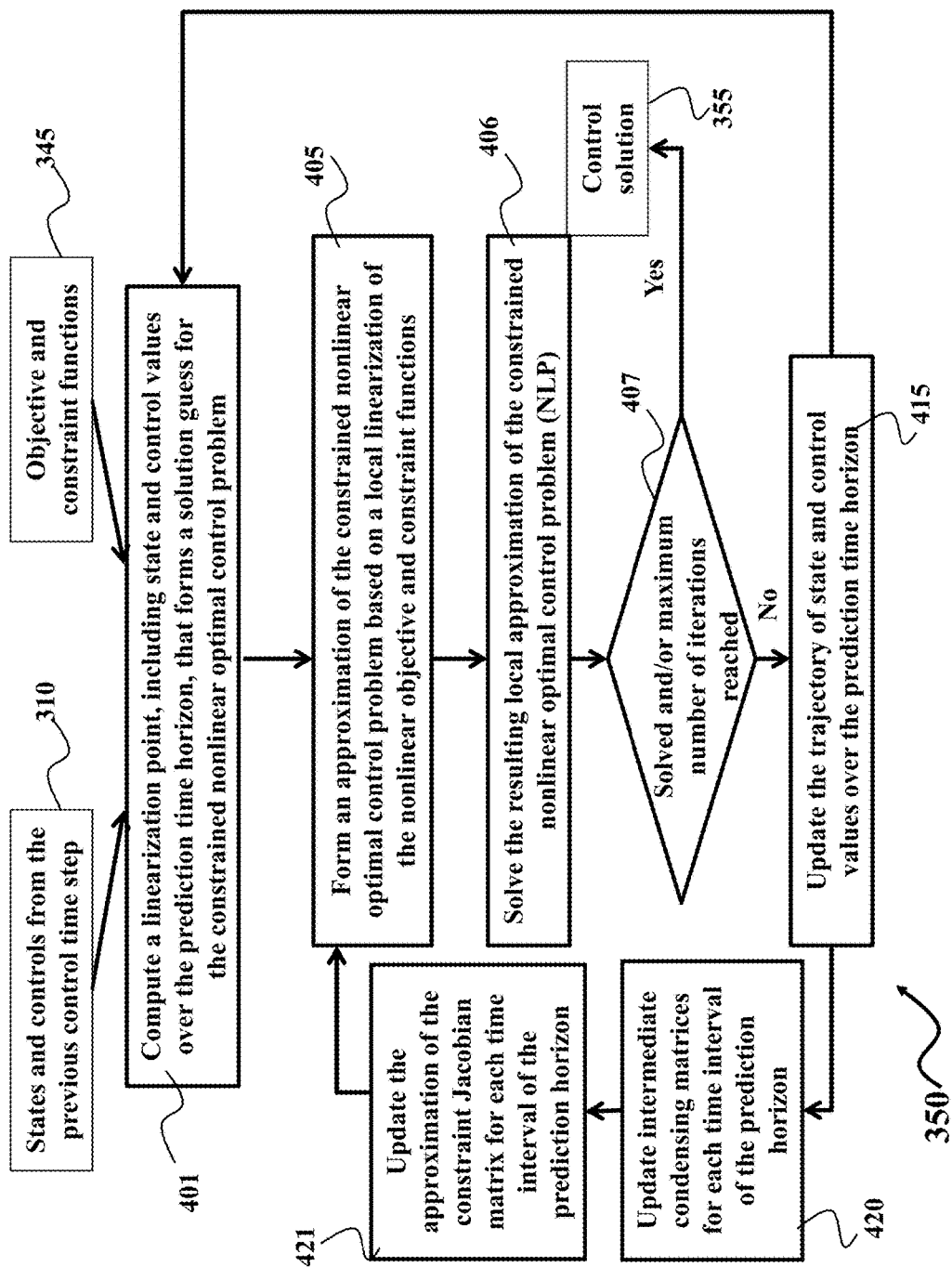
FIG. 4B is a block diagram of an iterative procedure to solve the constrained NLP at each control time step via the use of Jacobian matrix approximations, for each interval of the time horizon, that are updated from one iteration to the next.

FIG. 4B shows a block diagram of an iterative procedure to solve the constrained, optimal control structured, nonlinear program (NLP) 350 at each control time step via the use of successive local approximations 406. In particular, an approximation to the NLP is constructed based on a local linearization of the nonlinear objective and constraint functions. A linearization point is needed that includes the state and control values over the prediction time horizon 401, which are updated based on the solution of the local approximation problem 415. In addition, an approximation of the constraint Jacobian matrix for each interval of the prediction time horizon is constructed and updated in each iteration 421, based on the solution of the local approximation problem 415.

In some embodiments of a nonlinear MPC controller, an optimal control structured NLP is solved at each control time step 350, based on an implicit formulation of the discrete time system dynamics 356-357. A system of nonlinear equations $0=G_i(x_i,u_i,K_i)$ 356 implicitly defines a set of intermediate variables $K_i$. In some embodiments, a condensing procedure is used to numerically eliminate those additional intermediate variables from each local approximation of the NLP, resulting in intermediate condensing matrices in order to compute the corresponding constraint Jacobian matrices for each interval of the prediction time horizon in the condensed approximation problem formulation 405. Subsequently, an expansion procedure is used to compute the values of the numerically eliminated intermediate variables from the solution of the condensed approximation 406. The iterative optimization algorithm can directly update each approximation of these intermediate condensing matrices 420, resulting in an update to the approximate constraint Jacobian matrices 421. The construction and/or update of approximations to both the intermediate condensing matrices 420 and the constraint Jacobian matrices 421 can be performed independently for each time interval of the prediction horizon.

In some embodiments of a nonlinear MPC controller, an optimal control structured NLP is solved at each control time step 350, based on an explicit formulation of the discrete time system dynamics 353. In this case, the constraint Jacobian matrices can be updated directly 421, without the construction or updates of intermediate condensing matrices since, in the case of an explicit formulation of the discrete time system dynamics 353, there are no intermediate variables that are defined implicitly by a system of nonlinear equations.

Figure 4C:
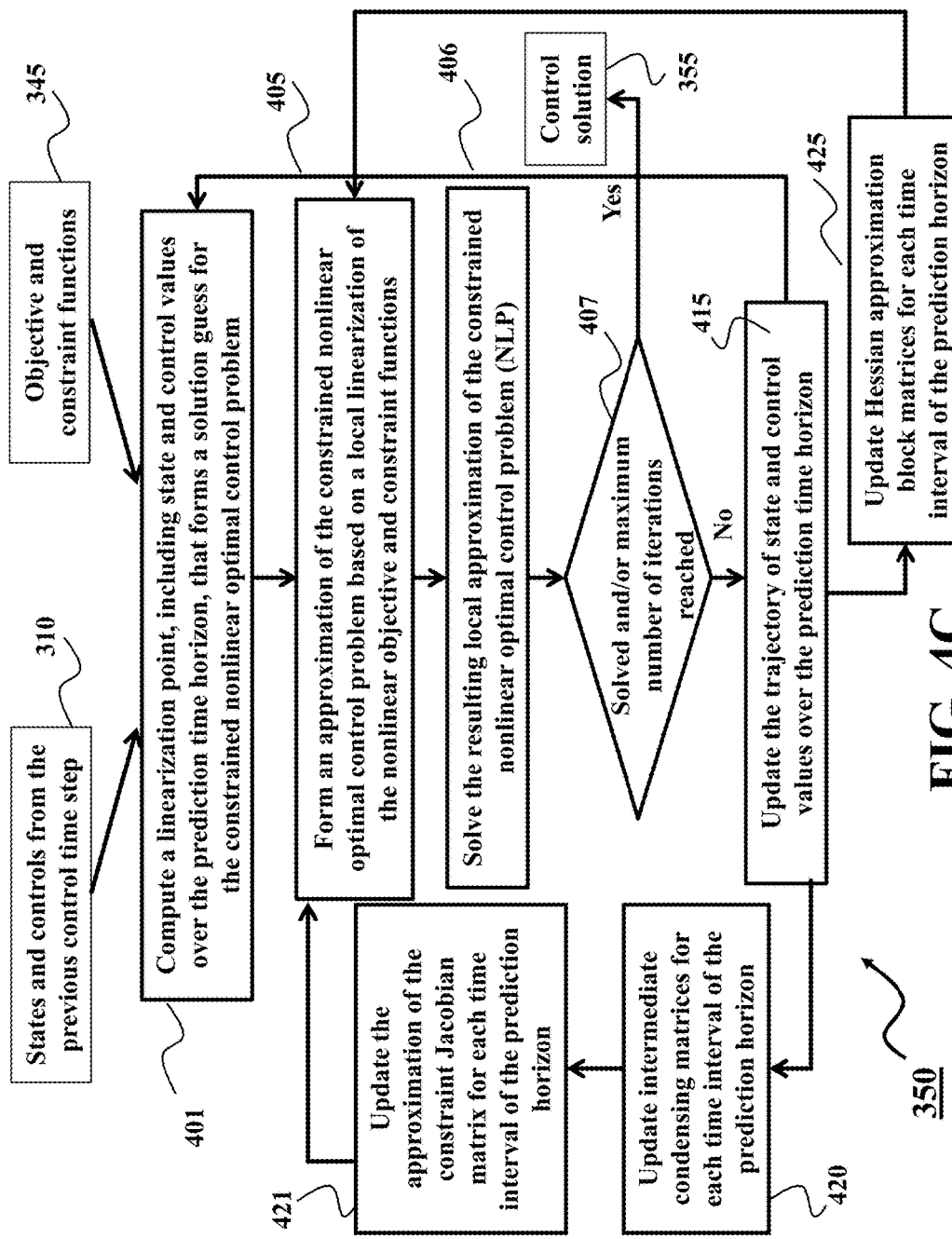
FIG. 4C is a block diagram of an iterative procedure to solve the constrained NLP at each time step via the use of Jacobian and Hessian matrix approximations, for each interval of the time horizon, that are updated from one iteration to the next.

FIG. 4C shows a block diagram of an iterative procedure to solve the constrained, optimal control structured, nonlinear program (NLP) 350 at each control time step via the use of successive local approximations 406, using an update formula for the constraint Jacobian approximations 421 based on the construction and updates of intermediate condensing matrices for each time interval 420. In addition, some embodiments construct and update approximations of Hessian block matrices 425 from one iteration of the optimization procedure to the next iteration. The construction and/or update to these Hessian approximations can also be performed independently for each time interval of the prediction horizon 425.

Figure 5A:
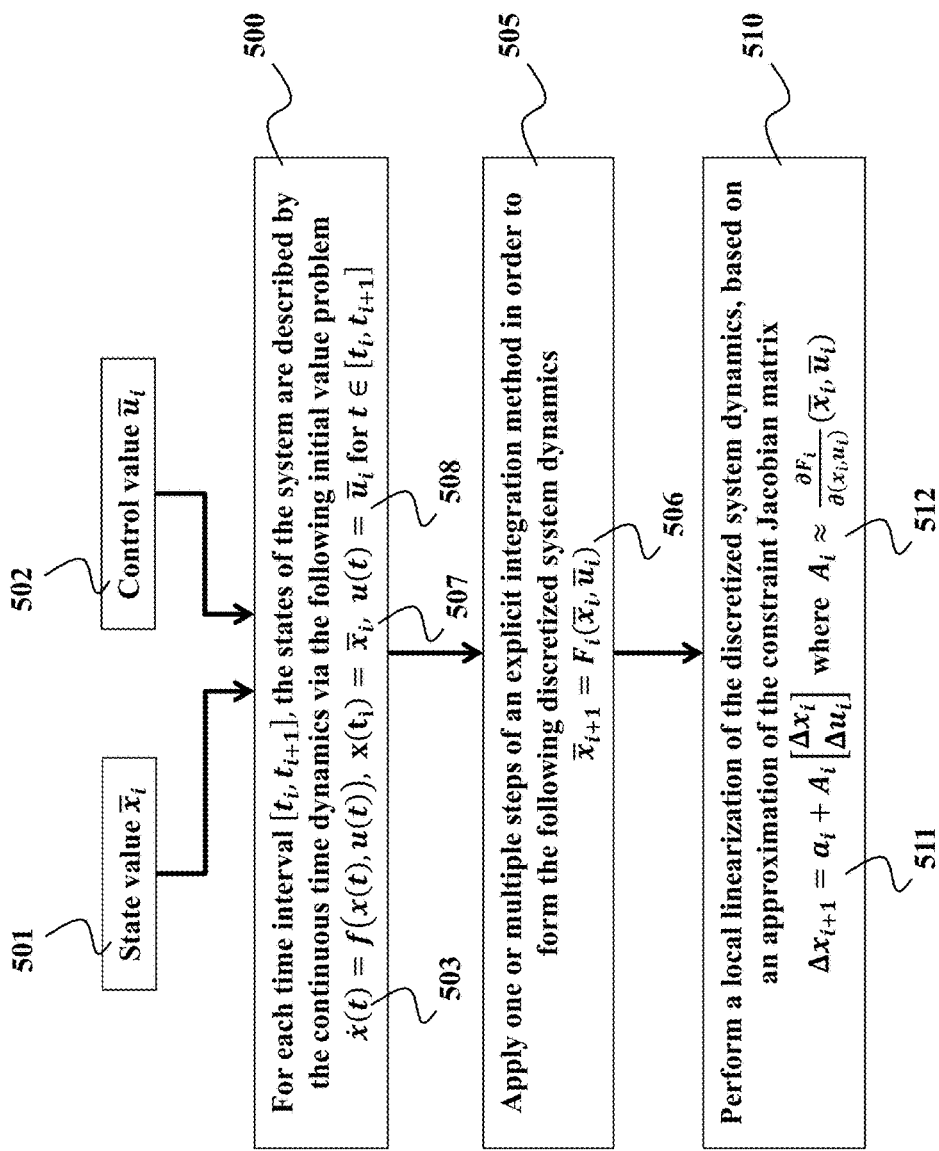
FIG. 5A is a block diagram of a time discretization, control parameterization and local linearization of the system dynamics, based on an explicit integration scheme for an explicit system of nonlinear differential equations.

FIG. 5A shows a block diagram for obtaining the explicit formulation of the discrete time system dynamics 353 as part of the optimal control structured NLP that is solved at each control time step 350. The dynamical model formulation of the system is explicit, because the state value at a certain time point $t_{i+1}$ is defined explicitly by the state value 501 and the control input 502 at the previous time point $t_i$ via an explicit function $x_{i+1}=F_i(x_i,u_i)$ 506. In some embodiments, the dynamic model of the system is given originally by a system of continuous time differential equations 503, which describe the states of the system over a certain time interval $[t_i, t_{i+1}]$ via the solution of an initial value problem 500. As part of the formulation of this initial value problem, the initial state value 507 at time point $t_i$ as well as the control inputs 508 over the complete time interval $[t_i, t_{i+1}]$ need to be provided. For this purpose, the sequence of control inputs over the prediction time horizon needs to be parameterized using a finite dimensional representation that is used directly in the optimal control structured NLP that is solved at each control time step 350. In some embodiments, a piecewise constant control parameterization is used in which the control input is a constant value over each time interval independently, i.e., $u(t)=\bar{u}_i$ for $t \in [t_i, t_{1+1}]$ 508. Some other embodiments use a higher order control parameterization, e.g., based on a piecewise polynomial or a spline representation over the prediction time horizon.

In some embodiments, the explicit formulation of the discrete time system dynamics 506 is obtained by applying one or multiple steps of an explicit integration scheme 505 to solve the initial value problem 500, defined by a set of continuous time differential equations $\dot{x}(t)=f(x(t),u(t))$ 503. Examples of such explicit integration schemes are the Adams-Bashforth methods and the family of explicit Runge-Kutta methods. The iterative procedure to solve the resulting constrained NLP then constructs a local linearization of these discretized system dynamics 510, based on an approximation of the constraint Jacobian matrix 512 for each interval of the prediction time horizon, and solves the resulting local approximation of the NLP 406. In some embodiments, based on sequential quadratic programming, the linearized discrete time system dynamics 511 for each interval of the prediction time horizon are part of the equality constraints in the Quadratic Program (QP) approximation that is solved in each iteration of the optimization algorithm 406. In other embodiments, based on interior point techniques, the linearized discrete time system dynamics 511 for each interval of the prediction time horizon are part of the linearized system of optimality conditions that is solved in each iteration 406.

Figure 5B:
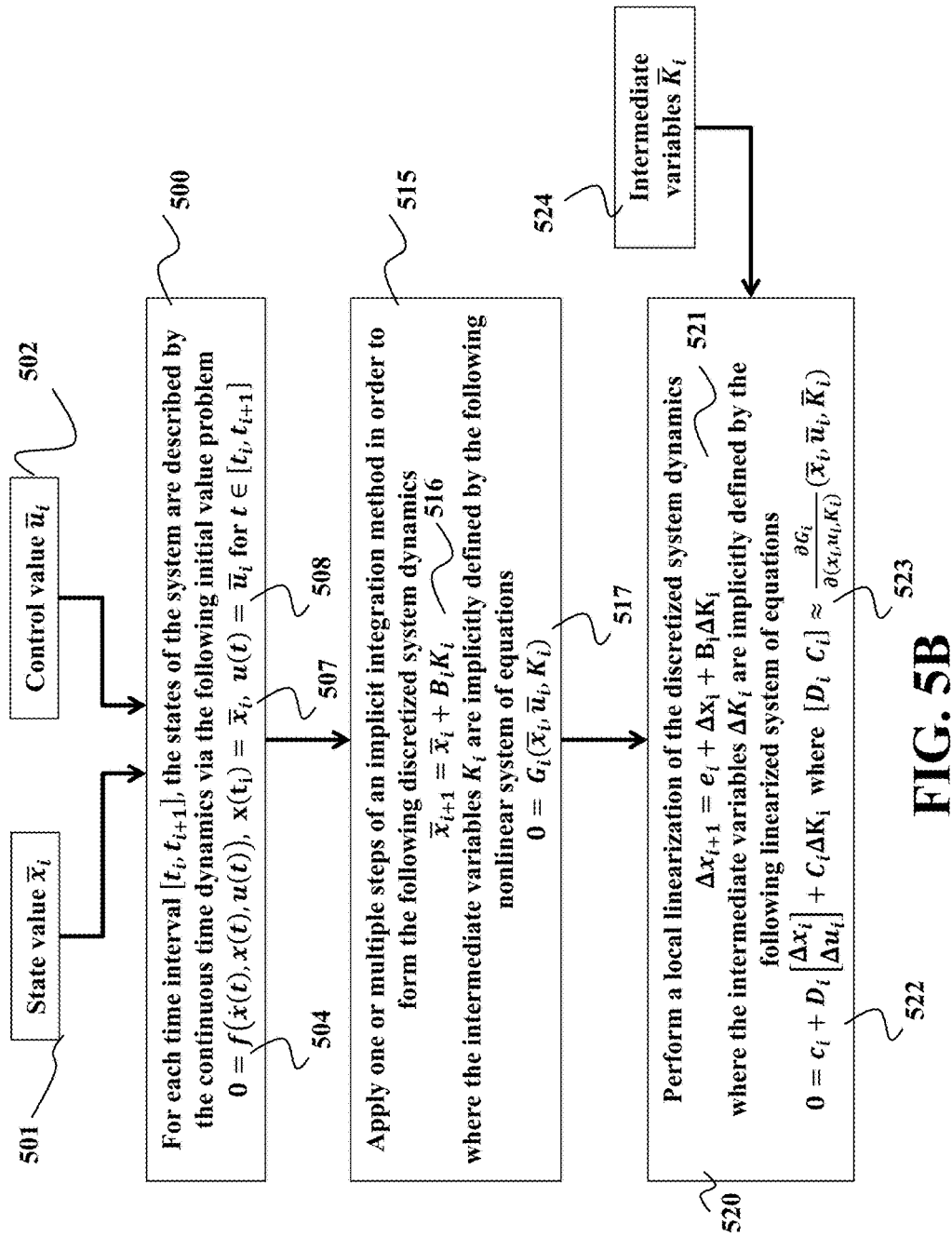
FIG. 5B is a block diagram of a time discretization, control parameterization and local linearization of the system dynamics, based on an implicit integration scheme for an implicit system of nonlinear differential equations.

FIG. 5B shows a block diagram for obtaining the implicit formulation of the discrete time system dynamics 356-357 as part of the optimal control structured NLP that is solved at each control time step 350. The dynamical model formulation of the system is implicit, because the state value at a certain time point $t_{i+1}$ is defined by the state value 501, the control input 502 and a set of additional intermediate variables 524 that are defined implicitly by these state and control values at the previous time point $t_i$ 516. These intermediate variables $K_i$ are defined implicitly by the set of nonlinear equations $0=G_i(x_i,u_i,K_i)$ 517, i.e., the Jacobian of these equations with respect to the intermediate variables $$\frac{\partial G_i}{\partial K_i}(\cdot)$$

is a square matrix that must be nonsingular. In some embodiments, the dynamic model of the system is given originally by a system of continuous time differential equations 504, which describe the states of the system over a certain time interval $[t_i, t_{i+1}]$ via the solution of an initial value problem 500 given the initial state value 507 and the control inputs over this interval 508.

In some embodiments, this implicit formulation of the discrete time system dynamics 516-517 is obtained by applying one or multiple steps of an implicit integration scheme 515 to solve the initial value problem 500, defined by a set of continuous time differential equations $0=f(\dot{x}(t), x(t),u(t))$ 504. In some embodiments, this system of differential equations 504 defines the differential state derivatives implicitly and/or it defines algebraic variables based on additional implicit algebraic equations. Examples of implicit integration schemes include the Adams-Moulton methods, the backward differentiation formulas and the family of implicit Runge-Kutta methods.

The iterative procedure to solve the resulting constrained NLP then constructs a local linearization of these discretized system dynamics 520, based on a local linearization of the continuity equation 521 and of the nonlinear equations that define the intermediate variables 522 for each interval of the prediction time horizon, and solves the resulting local approximation of the NLP 406. This linearization starts from a linearization point that includes the state values 501, the control inputs 502 as well as the current values for the intermediate variables 524. Given the nonlinear equations that implicitly define the intermediate variables 517, the local linearization can be based on an approximation of the constraint Jacobian matrix for this nonlinear system of equations 523.

In some embodiments, both the linear continuity equation 521 and the linearized system of equations that implicitly defines the intermediate variables 522 for each interval of the prediction time horizon are part of the approximation that is solved in each iteration of the optimization algorithm 406. In some embodiments, the intermediate variables are eliminated numerically from the linearized system of equations based on the invertibility of the constraint Jacobian and its approximation $$C_i \approx \frac{\partial G_i}{\partial K_i}(\bar{x}_i, \bar{u}_i, \bar{K}_i) \; 523,$$

resulting in a condensed formulation of the linearized discrete time system dynamics of the same form as the linearization for an explicit formulation of the system dynamics 511.

FIG. 6A shows a block diagram of a Quadratic Program (QP) that forms a local approximation 605 of the optimal control structured NLP 600, in case of an explicit formulation of the discrete time system dynamics 353, according to some embodiments based on sequential quadratic programming. The linear equality constraint 603 in the QP subproblem corresponds to the linearized discrete time system dynamics 511 based on an approximation of the constraint Jacobian matrix 512. The initial value condition 602 in the optimal control structured QP is equivalent to the corresponding equality constraint 352 in the NLP. In addition, a local linearization 604 is needed for the inequality constraints 354 in the original NLP formulation, for which one can use either an exact linearization or an approximation of the Jacobian matrix for these inequality constraints.

The quadratic objective 601 in the optimal control structured QP 605 locally approximates the nonlinear objective 351. As mentioned earlier, the Hessian matrix $H_i$ can be based either on an exact evaluation of the Hessian of the Lagrangian, or using a quasi-Newton type update formula or a Gauss-Newton Hessian approximation for each interval of the prediction time horizon. The vectors that correspond to the constraint evaluations $a_i$ and the gradient evaluations $h_i$ both need to be exact for the QP subproblem 605 to form a local approximation to the NLP 600. In some embodiments, the gradient vector $h_i$ corresponds to an evaluation of the gradient of the Lagrangian for the NLP with respect to the state and control variables. In some other embodiments, the gradient vector $h_i$ corresponds to an evaluation of the gradient of the NLP objective function 351 with respect to the state and control variables, including a gradient correction that depends on the quality of the approximation for the constraint Jacobian matrices of the equality and/or inequality constraints in the local QP approximation of the NLP.

Figure 6B:
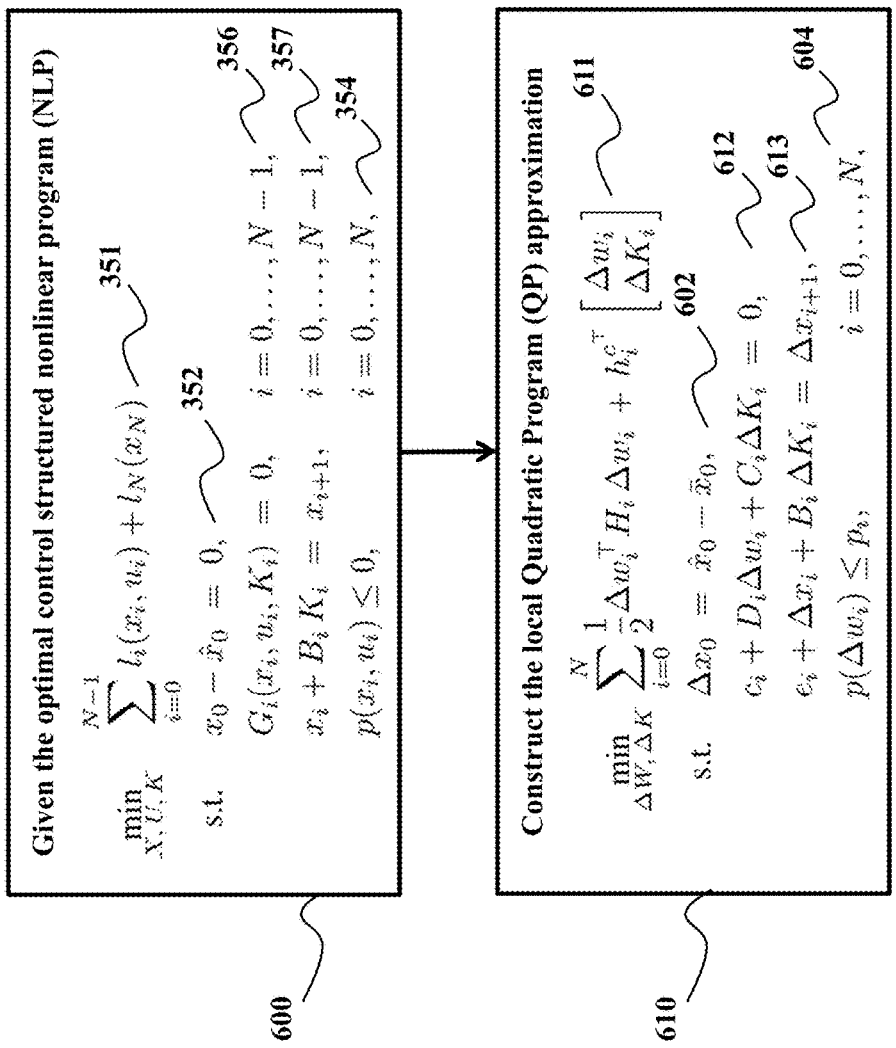
FIG. 6B is a block diagram of a local approximation of the optimal control structured NLP via a local Quadratic Program (QP) approximation, based on an implicit formulation of the discrete time system dynamics.

FIG. 6B shows a block diagram of a Quadratic Program (QP) that forms a local approximation 610 of the optimal control structured NLP 600, in case of an implicit formulation of the discrete time system dynamics 356-357, according to some embodiments based on sequential quadratic programming. The linear continuity condition 613 in the QP approximation is equivalent to the corresponding equality constraint 357 in the NLP, because of the linear relation between the state values at the next and the previous time point given the values of the intermediate variables. The linear equality constraint 612 in the QP subproblem corresponds to the linearized system of equations 522 based on an approximation of the constraint Jacobian matrix 523, and it forms a local linearization for the nonlinear system of equations 356 in the NLP. The gradient vector $h_i^c$ in the quadratic objective 611 of the optimal control structured QP 610 depends also on the values of the intermediate variables in the linearization point that is used to construct the local QP approximation. Similar to before, this gradient vector can correspond to the evaluation of the gradient of either the NLP Lagrangian or of the NLP objective, including a gradient correction that depends on the quality of the approximation for the constraint Jacobian matrices of the equality and/or inequality constraints in the local QP approximation 610 of the NLP 600.

Figure 6C:
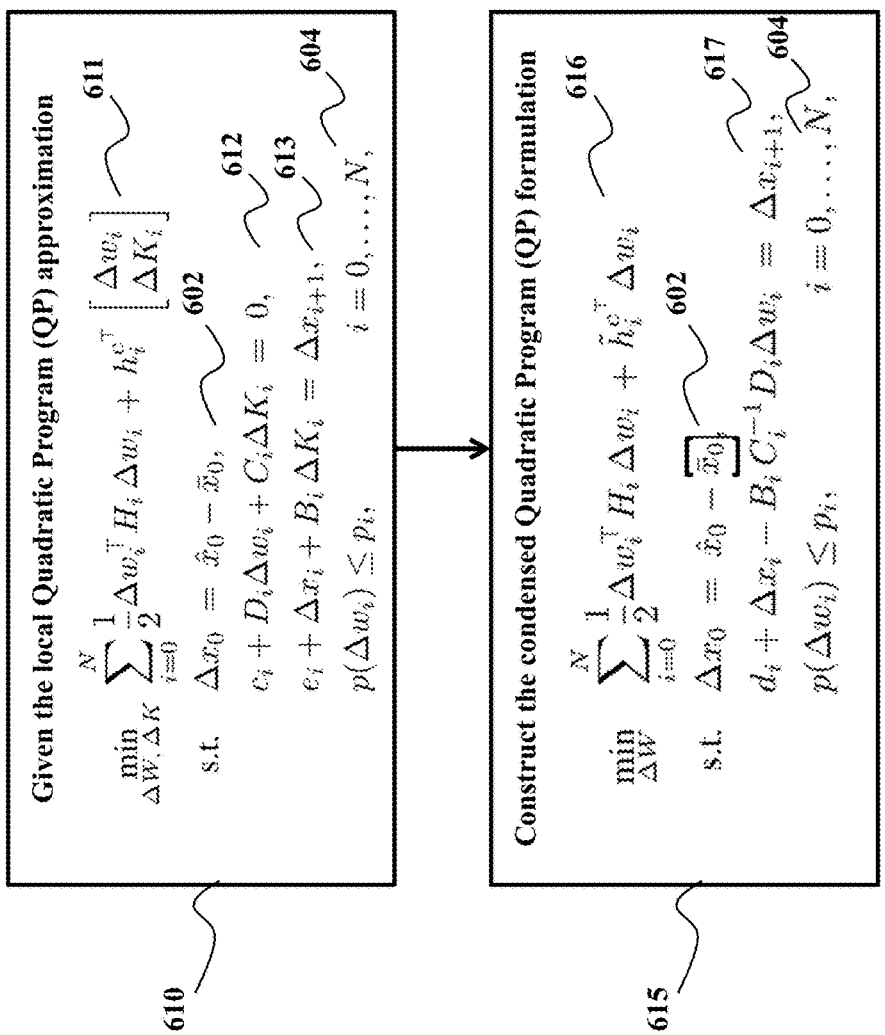
FIG. 6C is a block diagram of the condensing procedure to numerically eliminate the intermediate variables in a local QP approximation of the NLP, based on an implicit formulation of the discrete time system dynamics.

FIG. 6C shows a block diagram of a condensing procedure that constructs the condensed QP formulation 615 given the local QP approximation 610 of the optimal control structured NLP based on an implicit formulation of the discrete time system dynamics. The condensing procedure numerically eliminates the intermediate variables from the linearized system of equations 612 in the QP approximation, based on the invertibility of the constraint Jacobian and its approximation $$C_i \approx \frac{\partial G_i}{\partial K_i}(\bar{x}_i, \bar{u}_i, \bar{K}_i) \; 523.$$

In some embodiments, this numerical condensing procedure can be performed independently and therefore in parallel for each of the time intervals of the prediction horizon. The result of this procedure includes a condensed formulation of the linearized discrete time system dynamics 617 of the same form as the linearization for an explicit formulation of the system dynamics 603, as well as a condensed objective function 616 in the new formulation of the local QP approximation 615. As discussed also further, the numerically eliminated intermediate variables, as well as the Lagrange multipliers corresponding to the linearized constraints 612 in the original QP formulation, can be obtained based on an appropriate expansion procedure and given the optimal solution to the condensed QP approximation 615 of the NLP 600.

Figure 7A:
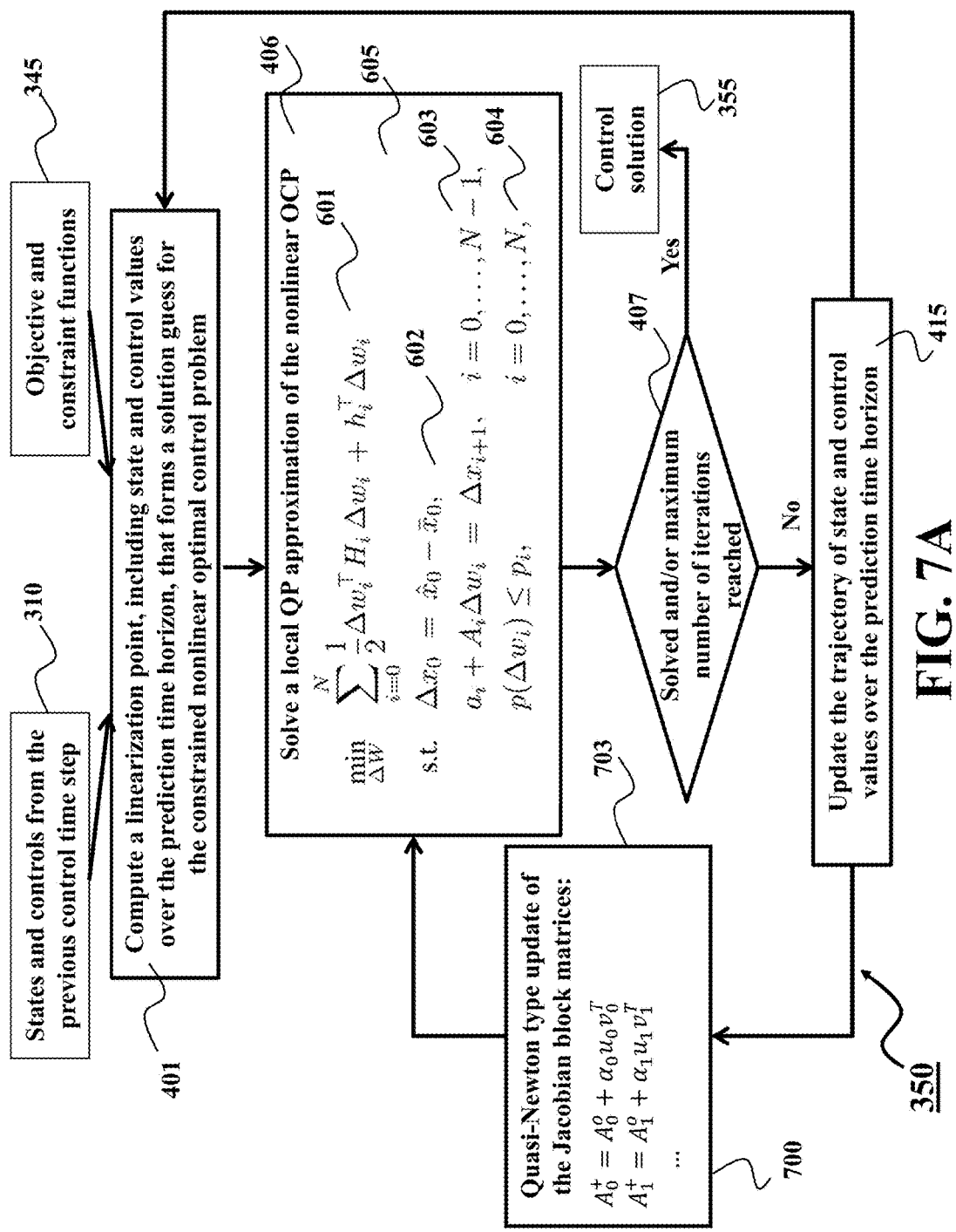
FIG. 7A is a block diagram of an iterative procedure to solve the constrained NLP, based on an explicit formulation of the discrete time system dynamics, via successive local QP approximations and a block-structured quasi-Newton type update scheme for the constraint Jacobian matrices.

FIG. 7A shows a block diagram of an iterative procedure to solve the constrained, optimal control structured, nonlinear program (NLP) 350 at each control time step via the use of successive local approximations 406, using an update formula for the approximations of the constraint Jacobian block matrices 700. Some embodiments are based on sequential quadratic programming (SQP) and they formulate and solve a Quadratic Program (QP) that forms a local approximation 605 of the optimal control structured NLP 600, in case of an explicit formulation of the discrete time system dynamics 353. The linear equality constraint 603 in the QP subproblem corresponds to the linearized discrete time system dynamics 511 based on an approximation of the constraint Jacobian matrix 512.

Some embodiments are based on the realization that the update to the constraint Jacobian block matrices 700 can be performed independently for each of the intervals in the prediction time horizon. In some embodiments of the invention, the update corresponds to a block-wise quasi-Newton type update formula 703 in which the update to each of the block matrices individually is of rank one. One example of the block-wise quasi-Newton type update formula 703 is based on Broyden's method, using either the good or the bad Broyden's method or any other variant of this class of quasi-Newton methods with at least one evaluation of the discretized dynamics of the system. Another example is based on a block-wise variant of the two-sided rank-one (TR1) update formula, with at least one evaluation of the discretized dynamics of the system and at least one evaluation of an adjoint directional derivative of the discretized dynamics of the system, and where each of the constraint Jacobian block matrices is updated using the two-sided rank-one (TR1) update scheme. Some embodiments are based on the forward variant of the TR1 update formula that satisfies the direct secant condition exactly and approximately satisfies the adjoint secant condition. Other embodiments are based on the adjoint variant of the TR1 update formula that satisfies the adjoint secant condition exactly and approximately satisfies the direct secant condition. And some other embodiments decide between the forward or adjoint update formula for each of the block matrices individually, corresponding to a specific interval in the prediction time horizon, depending on a certain heuristic rule.

Figure 7B:
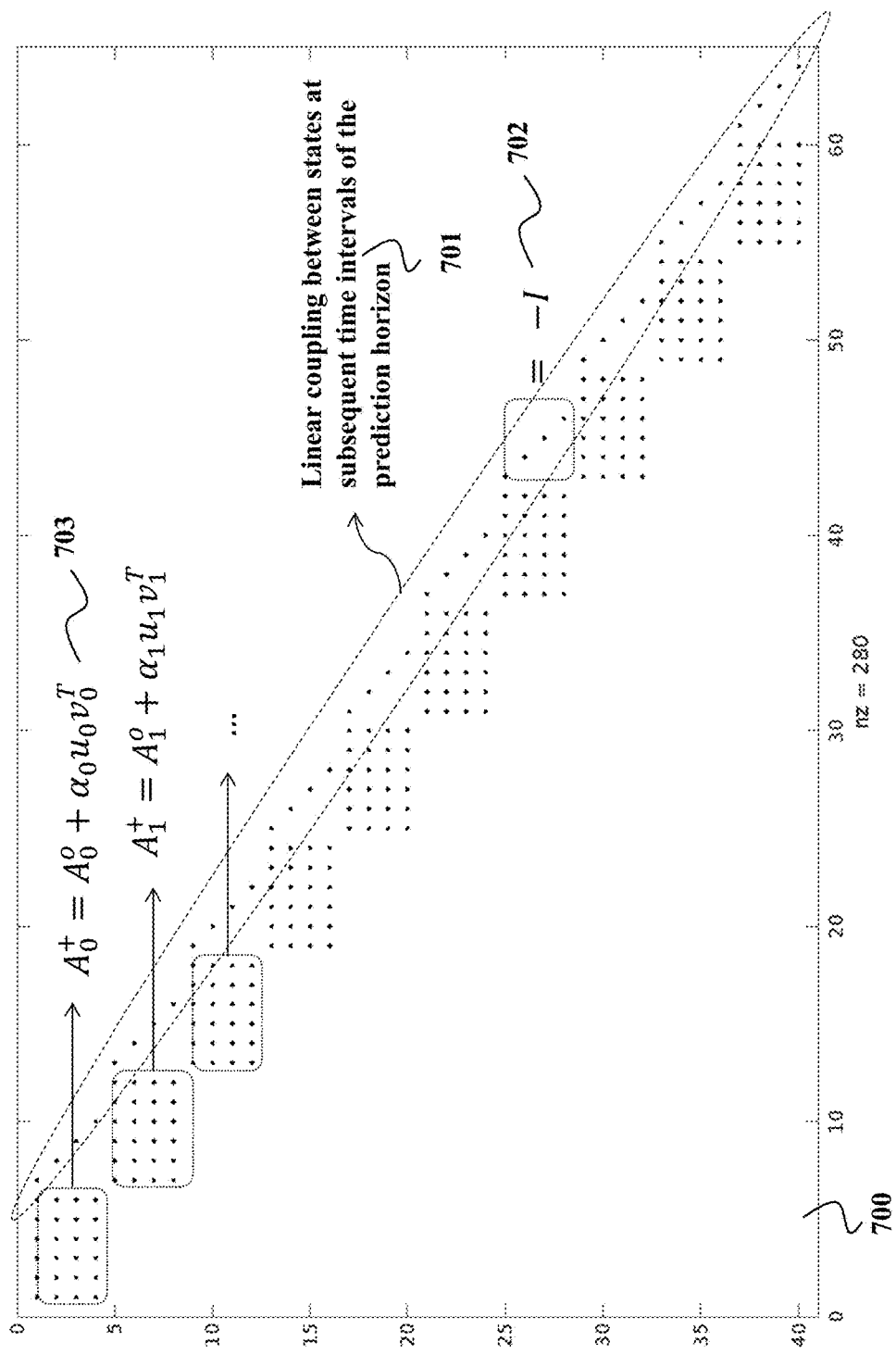
FIG. 7B is a schematic of the block-structured quasi-Newton type rank-one update scheme for the constraint Jacobian matrices.

FIG. 7B shows a schematic of the quasi-Newton type update scheme for the block-structured constraint Jacobian matrix 700, based on the block-wise quasi-Newton type method in which each of the block matrices is updated individually using a rank-one update formula 703. Each of the block matrices in the block-structured constraint Jacobian matrix corresponds to a specific linear equality constraint 603 in the local QP approximation of the optimal control structured NLP. The block matrices on the block diagonal correspond to the matrices $A_i$ in the linear equality constraint 603 and each of the block matrices on the upper block diagonal of the constraint Jacobian matrix, corresponding to the linear coupling between the state variables at subsequent time intervals of the prediction horizon 701, is equal to minus the identity matrix 702.

FIG. 7C shows a pseudo code of a real-time implementation of a nonlinear MPC controller 110, based on an explicit formulation of the discrete time system dynamics, via successive local QP approximations 605 and a block-structured quasi-Newton type update scheme 703 for the constraint Jacobian matrix 700. The inputs to the algorithm include the current values for the primal state and control variables, the dual Lagrange multipliers and the current approximations of the constraint Jacobian block matrices for each interval of the prediction time horizon 711. Similarly, the algorithm finally outputs the updated values for each of these variables 713. After obtaining the new state estimate 2 from the system 121, the local QP approximation 605 can be solved 406 such that the primal and dual variables can be updated 712 and the new control input values can be applied to the system 111, followed by the block-wise quasi-Newton type update formula for the constraint Jacobian block matrices 703. In some embodiments of the invention, the update for each of the block matrices is based on the two-sided rank-one (TR1) formula, resulting in a real-time iteration implementation of nonlinear MPC using block-TR1 based Jacobian updates 710.

Figure 8A:
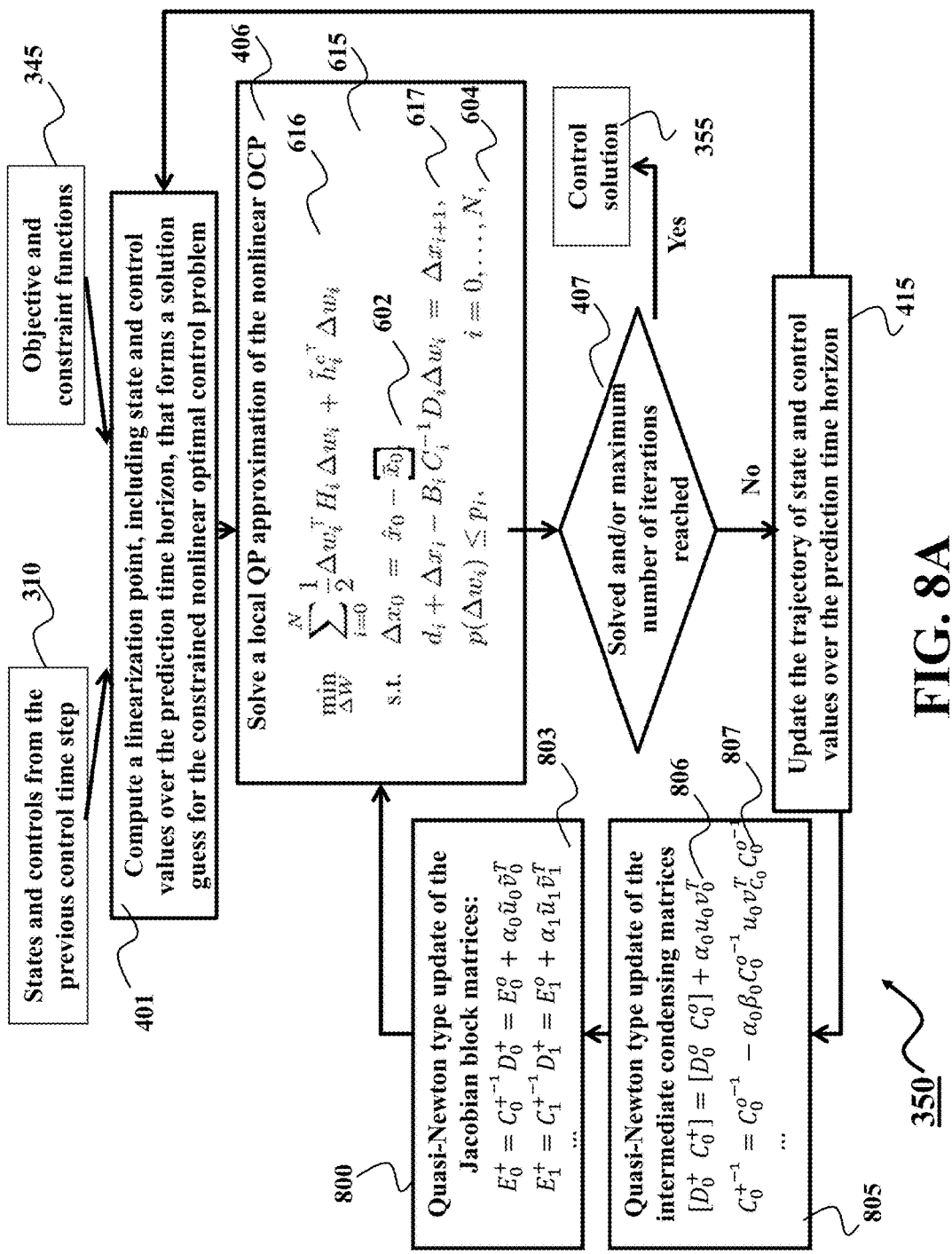
FIG. 8A is a block diagram of an iterative procedure to solve the constrained NLP, based on an implicit formulation of the discrete time system dynamics, via successive local QP approximations and a block-structured quasi-Newton type update scheme for the intermediate condensing and constraint Jacobian matrices.

FIG. 8A shows a block diagram of an iterative procedure to solve the constrained, optimal control structured, nonlinear program (NLP) 350 at each control time step via the use of successive local approximations 406, using an update formula for the approximations of the intermediate condensing matrices 805 resulting in an update for the approximations of the constraint Jacobian block matrices 800. Some embodiments are based on a condensing procedure that constructs the condensed QP formulation 615 given the local QP approximation 610 of the optimal control structured NLP based on an implicit formulation of the discrete time system dynamics. The result of this procedure includes a condensed formulation of the linearized discrete time system dynamics 617 of the same form as the linearization for an explicit formulation of the system dynamics 603, as well as a condensed objective function 616 in the new formulation of the local QP approximation 615.

Some embodiments are based on the realization that the update to the intermediate condensing matrices 806-807, the condensing procedure to numerically eliminate the intermediate variables from the linearized equations of the implicit formulation for the discrete time system dynamics 617 and the resulting update to the constraint Jacobian block matrices 803 can be performed independently for each of the intervals in the prediction time horizon. The update for the approximations of the constraint Jacobian matrices of the equations that implicitly define the intermediate variables 523 corresponds to a block-wise quasi-Newton type update formula 806 in which the update to each of the block matrices individually can be of rank one. Examples of such a quasi-Newton type update scheme include different variants of Broyden's method and different variants of the two-sided rank-one (TR1) update formula. In some embodiments of the invention, the inverse of the Jacobian matrix approximation $$C_i \approx \frac{\partial G_i}{\partial K_i}(\bar{x}_i, \bar{u}_i, \bar{K}_i)$$

can additionally be stored and updated from one iteration to the next 807 as part of the intermediate condensing matrices, depending on the quasi-Newton type update formula for the constraint Jacobian matrices and using the Sherman-Morrison formula that can be used to compute the inverse of a rank-one update to a matrix. Some embodiments are based on the realization that the condensed Jacobian block matrices can be updated directly using a block-wise rank-one update formula 803, based on the block-wise rank-one update formulas for the intermediate condensing matrices 806-807.

Figure 8B:
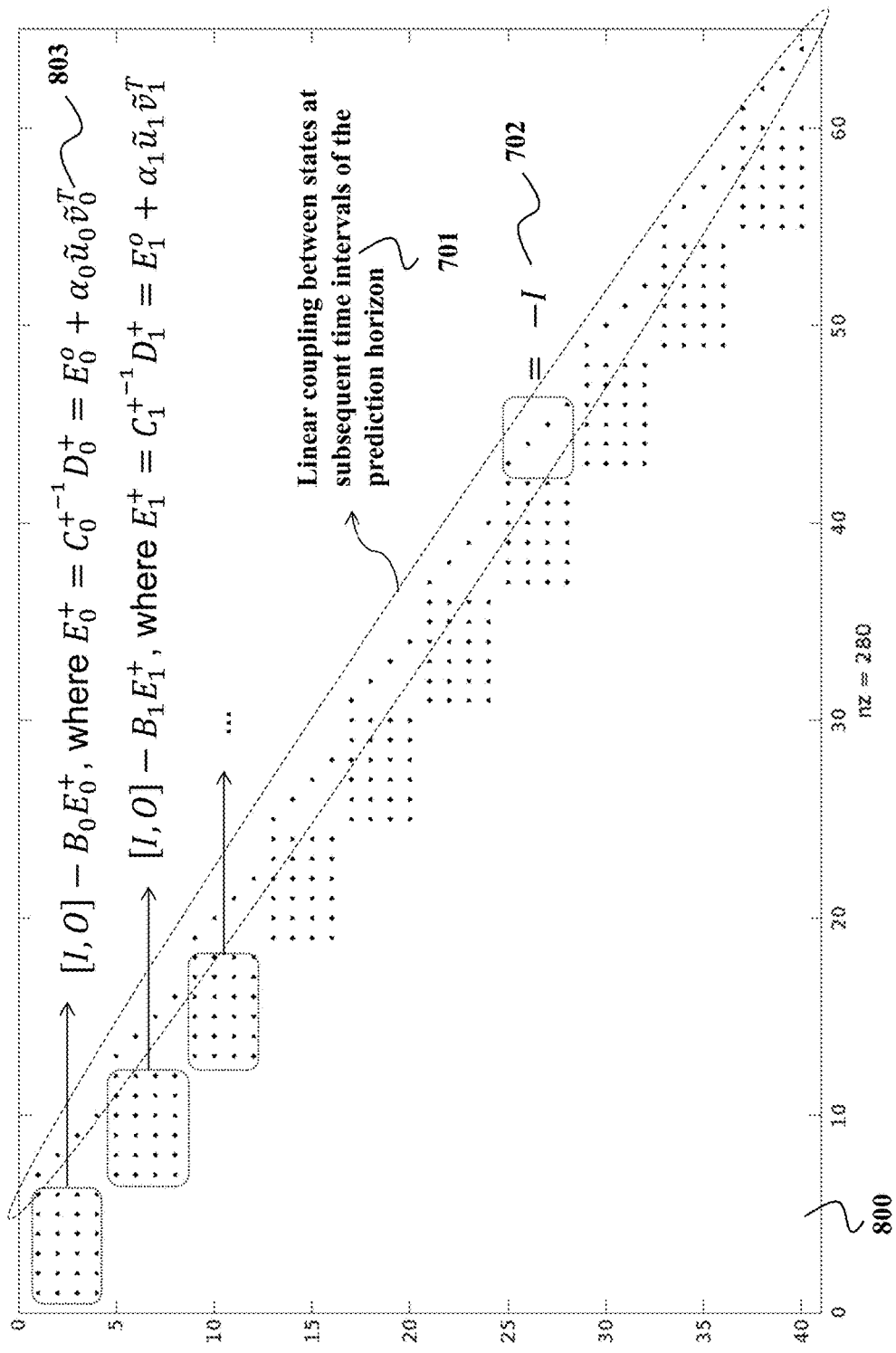
FIG. 8B is a schematic of the block-structured quasi-Newton type rank-one update scheme for the intermediate condensing and constraint Jacobian matrices.

FIG. 8B shows a schematic of the quasi-Newton type update scheme for the block-structured constraint Jacobian matrix 800, based on the block-wise quasi-Newton type method in which each of the block matrices is updated individually using a rank-one update formula 803. Each of the block matrices in the block-structured constraint Jacobian matrix corresponds to a specific linear equality constraint 617 in the local QP approximation of the optimal control structured NLP 615. The block matrices on the block diagonal correspond to the condensed Jacobian matrices $[I,O] - B_i E_i$, where $E_i = C_i^{-1} D_i$ in the condensed linear equality constraint 617. And each of the block matrices on the upper block diagonal of the constraint Jacobian matrix, corresponding to the linear coupling between the state variables at subsequent time intervals of the prediction horizon 701, is equal to minus the identity matrix 702.

FIG. 8C shows a pseudo code of a real-time implementation of a nonlinear MPC controller 110, based on an implicit formulation of the discrete time system dynamics, via successive local QP approximations 615 and a block-structured quasi-Newton type update scheme 805 for the constraint Jacobian matrix 800. The inputs to the algorithm include the current values for the primal state, control and intermediate variables, the dual Lagrange multipliers and the current approximations of the intermediate condensing matrices and of the constraint Jacobian block matrices for each interval of the prediction time horizon 811. Similarly, the algorithm finally outputs the updated values for each of these variables 813. After obtaining the new state estimate $\hat{x}_0$ from the system 121, the local QP approximation 615 can be solved 406 such that the primal and dual variables can be updated 712 and the new control input values can be applied to the system 111, followed by the block-wise quasi-Newton type update formula for the intermediate condensing and the constraint Jacobian block matrices 805. In some embodiments of the invention, the update for each of the block matrices is based on the two-sided rank-one (TR1) formula and the implicit formulation of the discrete time system dynamics is based on direct collocation, resulting in a real-time iteration implementation of nonlinear MPC using lifted direct collocation with block-TR1 based Jacobian updates 810.

The numerically eliminated intermediate variables 808, as well as the Lagrange multipliers 809 corresponding to the linearized constraints 612 in the original QP formulation, can be obtained based on an appropriate expansion procedure and given the optimal solution 406 to the condensed QP approximation 615. In some embodiments of the invention, the computational operations in this algorithm, for which the pseudo code is depicted in FIG. 8C, can be restricted to matrix-vector multiplications based on the intermediate condensing matrices and to adjoint derivative evaluations. In some embodiments, the directional derivative evaluation for the expansion step of the Lagrange multipliers 809 can be carried out based on the forward or backward mode of algorithmic differentiation (AD). These embodiments perform the numerical elimination or condensing of the implicitly defined intermediate variables, based on the block-wise rank-one update formula, without any iterative solution procedure and without any matrix-matrix multiplications or matrix factorizations. Instead, these embodiments only require matrix-vector operations and one evaluation of the nonlinear equations and one evaluation of an adjoint directional derivative.

Figure 9A:
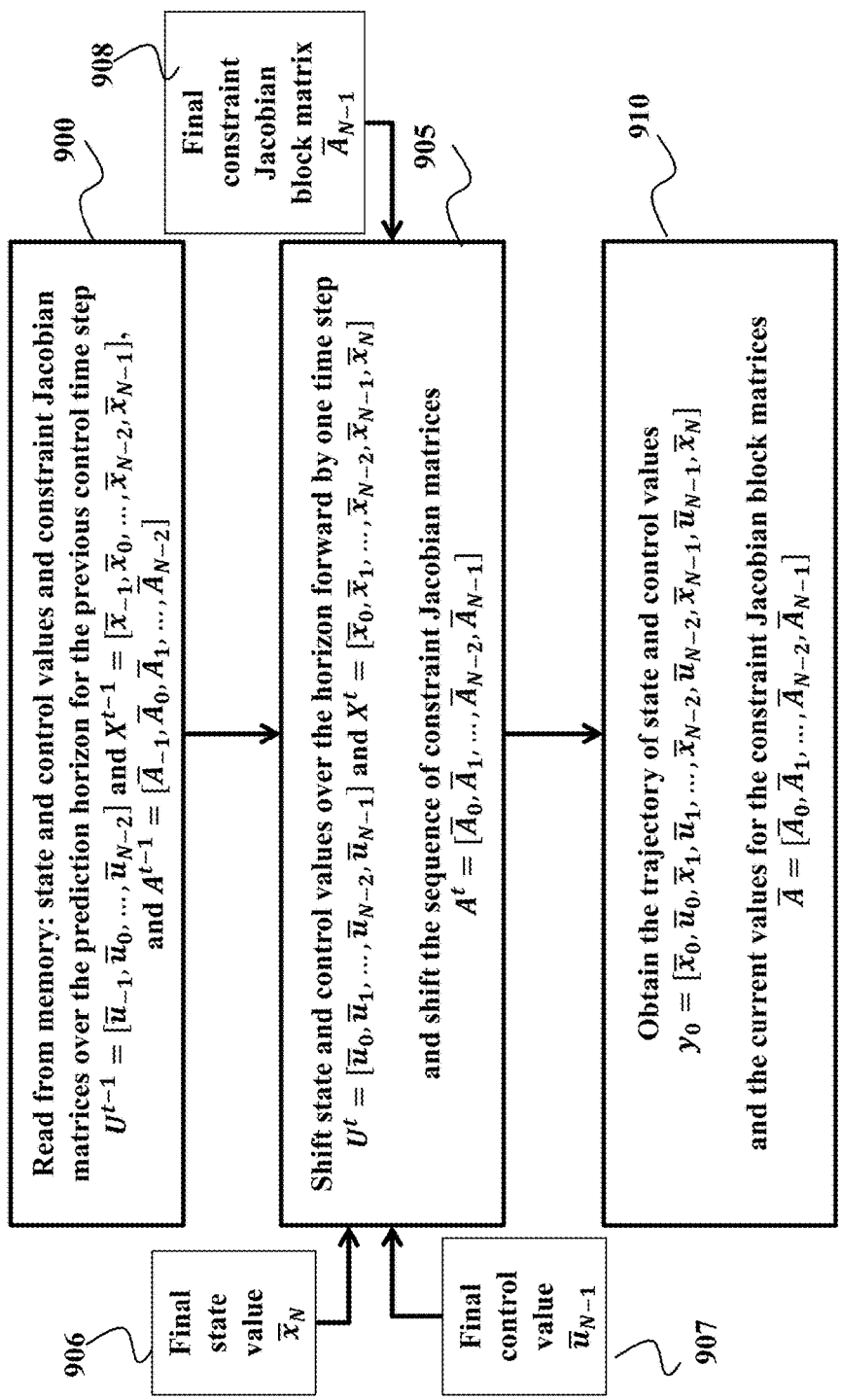
FIG. 9A is a block diagram of an initialization procedure for the state and control values and for the constraint Jacobian matrices in the nonlinear MPC controller, based on an explicit formulation of the discrete time system dynamics.

FIG. 9A shows a block diagram of an initialization procedure for the state and control values and for the constraint Jacobian matrices in the nonlinear MPC controller, based on the iterative solution procedure with the block-wise quasi-Newton type update formula for the explicit formulation of the discrete time system dynamics as described in FIG. 7. The solution values from the previous control time step can be read from memory 900 in order to provide the modified values 910 as an initial solution guess for the iterative solution procedure 711. In some embodiments of the invention, the sequence of solution values from the previous control time step 900 can be used directly as an initial solution guess for the iterative solution procedure 711. In some other embodiments, the sequence of solution values that is read from memory 900, is first to be shifted forward in the prediction horizon by one time step 905, based on a certain value for the final state 906, the control value 907 and the constraint Jacobian block matrix 908. These final state, control and constraint Jacobian values can correspond either to some fixed value that is computed offline before executing the system based on the nonlinear MPC controller, or they can be computed from the stored solution in the previous control time step 900.

Figure 9B:
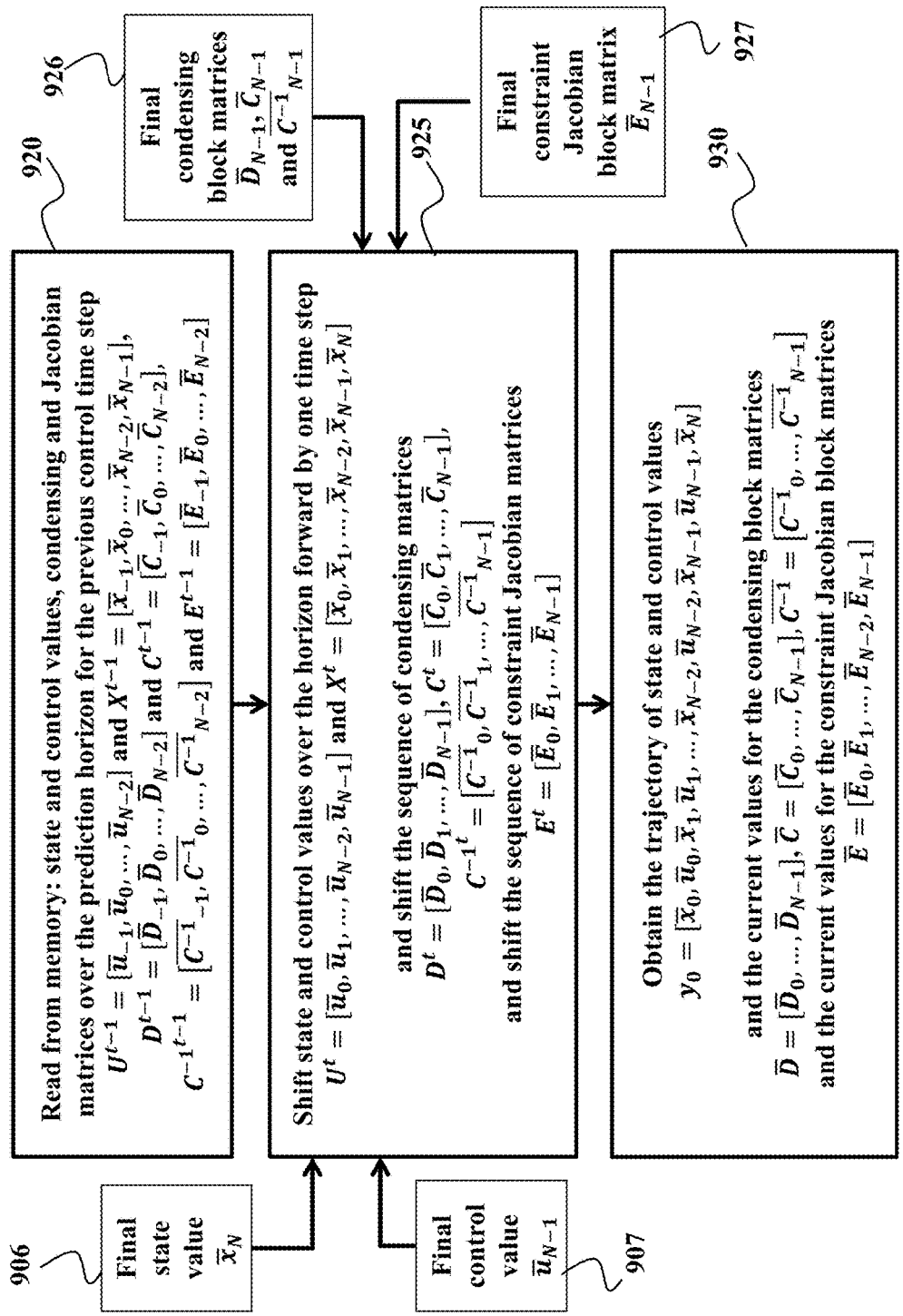
FIG. 9B is a block diagram of an initialization procedure for the state and control values and for the intermediate condensing and constraint Jacobian matrices in the nonlinear MPC controller, based on an implicit formulation of the discrete time system dynamics.

FIG. 9B shows a block diagram of an initialization procedure for the state and control values and for the intermediate condensing and constraint Jacobian matrices in the nonlinear MPC controller, based on the iterative solution procedure with the block-wise quasi-Newton type update formula for the implicit formulation of the discrete time system dynamics as described in FIG. 8. The solution values from the previous control time step can be read from memory 920 in order to provide the modified values 930 as an initial solution guess for the iterative solution procedure 811. In some embodiments of the invention, the sequence of solution values from the previous control time step 920 can be used directly as an initial solution guess for the iterative solution procedure 811. In some other embodiments, the sequence of solution values that is read from memory 920, is first to be shifted forward in the prediction horizon by one time step 925, based on a value for the final state 906, the control value 907, the final condensing block matrices 926 and the final constraint Jacobian block matrix 927. These final state, control, intermediate condensing and constraint Jacobian values can correspond either to some fixed value that is computed offline before executing the system based on the nonlinear MPC controller, or they can be computed from the stored solution in the previous control time step 920.

Figure 10A:
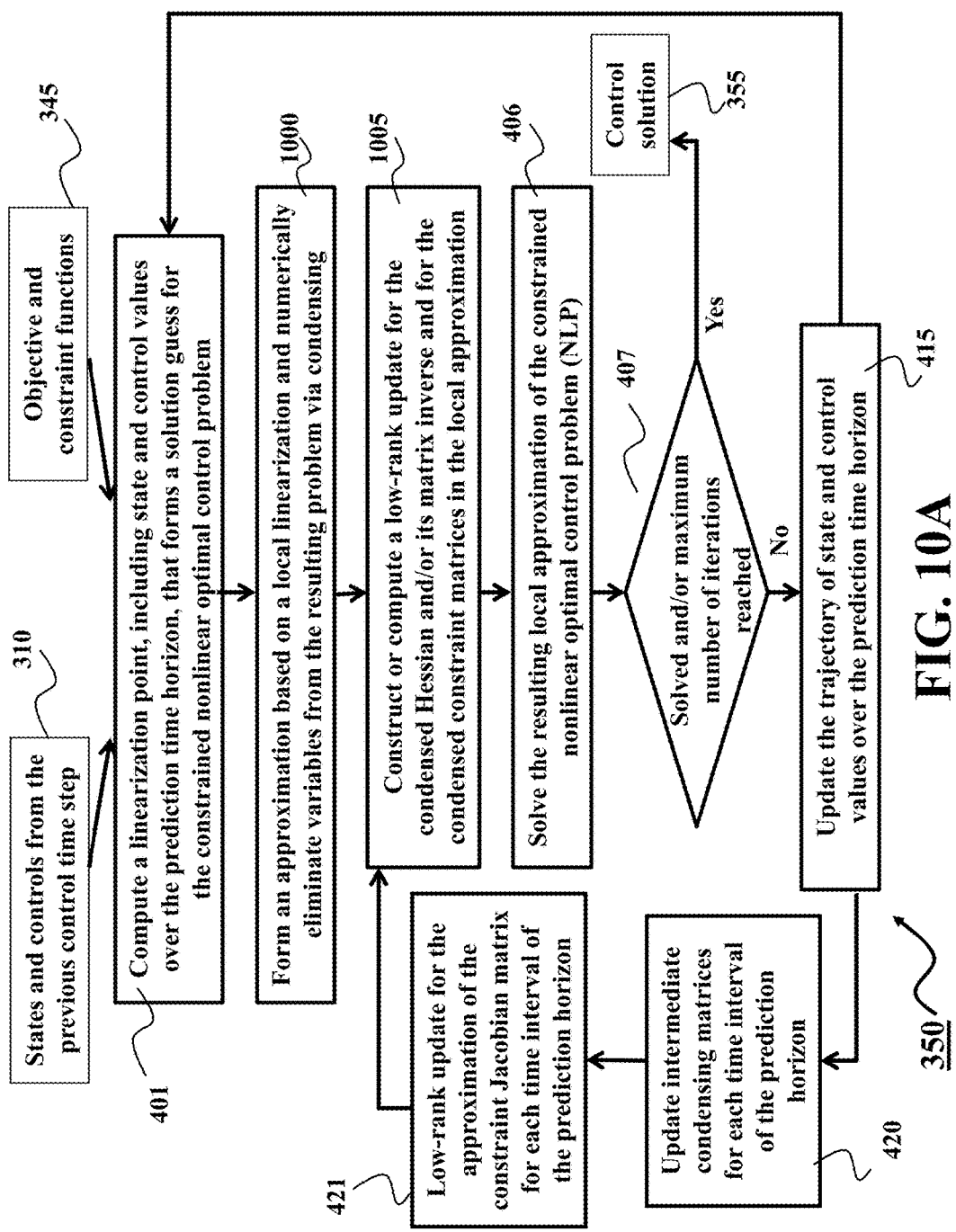
FIG. 10A is a block diagram of an iterative procedure to solve the constrained NLP at each control time step via the use of successive local approximations and numerical condensing for the updated constraint Jacobian approximations at each interval of the prediction time horizon.

FIG. 10A shows a block diagram of an iterative procedure to solve the constrained NLP at each control time step via the use of successive local approximations and a condensing procedure to numerically eliminate some or all of the variables that are defined by linearized equality constraints in the local approximation of the NLP 1000. One example of the condensing procedure is the numerical elimination of the intermediate variables from the linearized system of equations that implicitly defines these intermediate variables 522 for each interval of the prediction time horizon, based on an implicit formulation of the discrete time system dynamics, that results in the condensed QP formulation 615 given the local QP approximation 610 of the optimal control structured NLP. In some embodiments of the invention, the objective and/or the constraint functions of the optimal control structured NLP depend on the variables that are numerically eliminated such that the condensed Hessian matrix and/or the condensed Jacobian matrices for the remaining equality and/or inequality constraints need to be computed in order to construct the local approximation problem 1005.

Some embodiments are based on the factorization or the computation of the inverse of the condensed Hessian matrix in order to efficiently solve the local approximation of the nonlinear OCP at each control time step. Some embodiments are based on the realization that this matrix factorization or matrix inverse can be computed based on a low-rank update from one iteration to the next 1005, given a low-rank update to the approximation of the constraint Jacobian matrix 421. Note that a block-wise rank-one update to the constraint Jacobian matrix is of low rank in the case that the number of block matrices that are updated is relatively small. Some other embodiments are based on a low-rank update to the approximation of the complete constraint Jacobian matrix, which is generally a dense matrix in case of a global state and control parameterization over the complete prediction time horizon. One example of the latter includes the use of a pseudospectral method to solve the optimal control problem at each control time step, e.g., based on a global polynomial representation using a Gaussian quadrature rule. In particular, some embodiments use a rank-two symmetric update formula to update the condensed Hessian matrix 1005 and its factorization or matrix inverse, based on a rank-one update to the constraint Jacobian matrix 421.

Figure 10B:
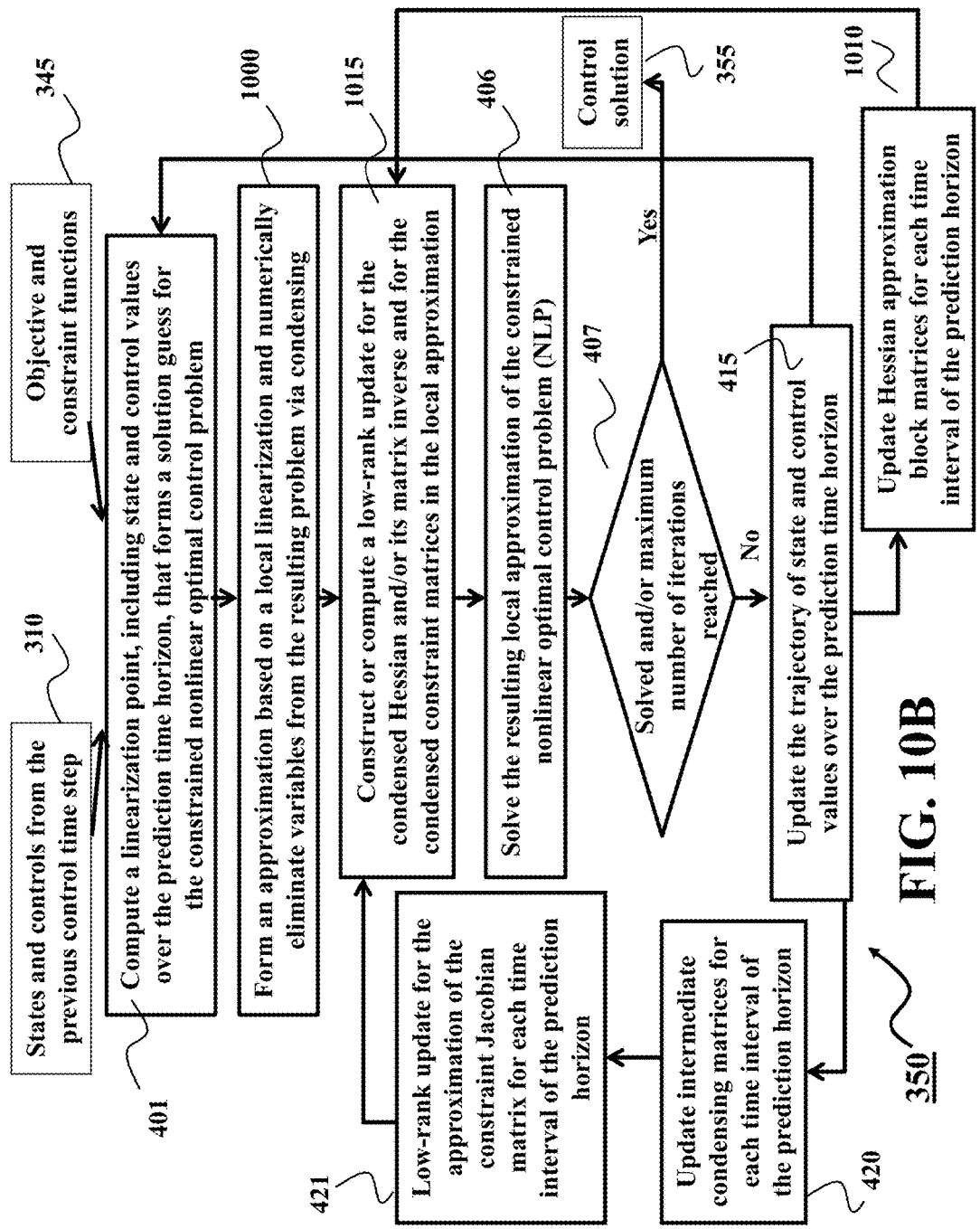
FIG. 10B is a block diagram of an iterative procedure to solve the constrained NLP at each control time step via the use of successive local approximations and numerical condensing for the updated constraint Jacobian and Hessian approximations at each interval of the prediction time horizon.

FIG. 10B shows a block diagram of an iterative procedure to solve the constrained NLP at each control time step via the use of successive local approximations and a numerical condensing procedure 1000, in which a low-rank update to the approximation of the Hessian block matrices 1010 in combination with a low-rank update to the approximation of the constraint Jacobian matrices 421 is used for each time interval of the prediction horizon. In particular, some embodiments use a rank-three symmetric update formula to update the factorization or matrix inverse of the condensed Hessian matrix 1015 based on a rank-one update to the constraint Jacobian matrix 421 and a quasi-Newton type rank-one update formula for the Hessian approximation matrix 1010. Examples of the quasi-Newton type update formula for the Hessian approximation include the Broyden-Fletcher-Goldfarb-Shanno (BFGS) method or the symmetric rank-one (SR1) update formula.

FIG. 11A shows a block diagram of a symmetric rank-two update formula to compute the condensed Hessian matrix 1105 given a rank-one update to the constraint Jacobian matrix 1100, according to some embodiments of the invention. Based on this symmetric rank-two update of the condensed Hessian matrix 1105, some embodiments additionally compute a rank-two update to the factorization of the condensed Hessian matrix. Examples of such a matrix factorization, for which low-rank factorization update techniques exist, include the Cholesky decomposition, LDL decomposition, QR decomposition or the LU decomposition. Based on the symmetric rank-two update of the condensed Hessian matrix 1105, some embodiments additionally compute a symmetric rank-two update to the inverse of the condensed Hessian matrix by using the Sherman-Morrison formula.

Figure 11B:
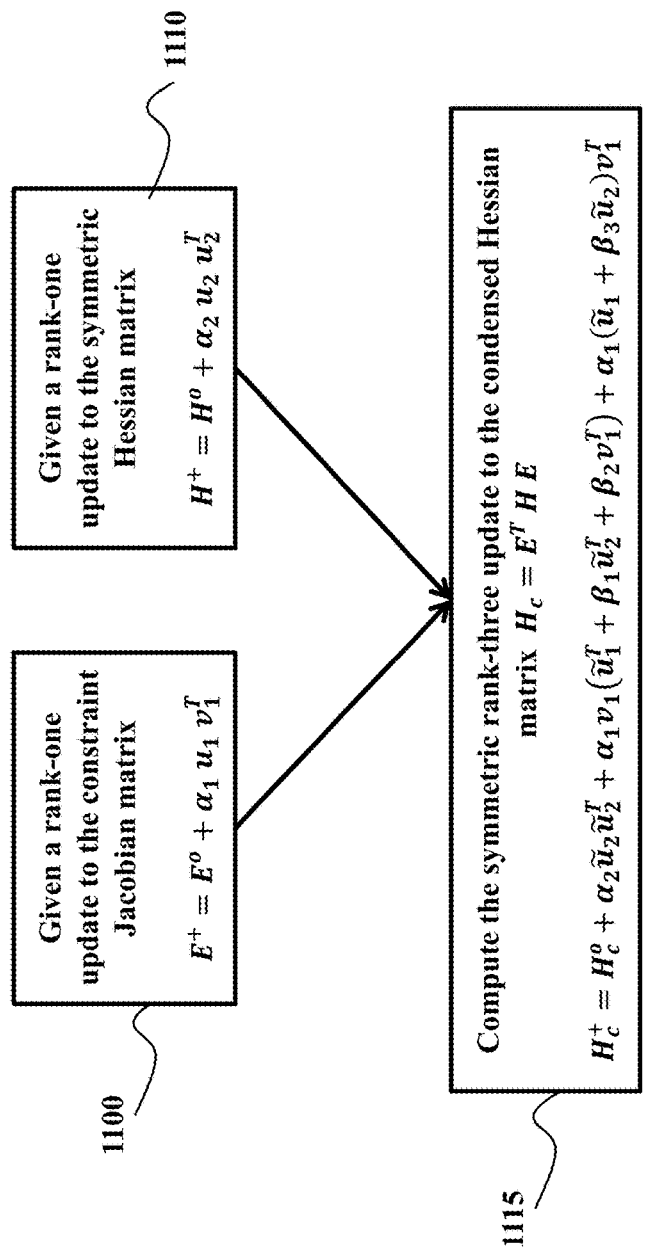
FIG. 11B is a block diagram of a symmetric rank-three update of the condensed Hessian matrix, given a rank-one update to the constraint Jacobian matrix as well as a rank-one update to the Hessian matrix.

FIG. 11B shows a block diagram of a symmetric rank-three update formula to compute the condensed Hessian matrix 1115 given a rank-one update to the constraint Jacobian matrix 1100 and given a rank-one update to the symmetric Hessian matrix approximation 1110, according to some embodiments of the invention. Based on this symmetric rank-three update to the condensed Hessian matrix 1115, some embodiments additionally compute a rank-three update to the factorization or the inverse of the condensed Hessian matrix.

Figure 12:
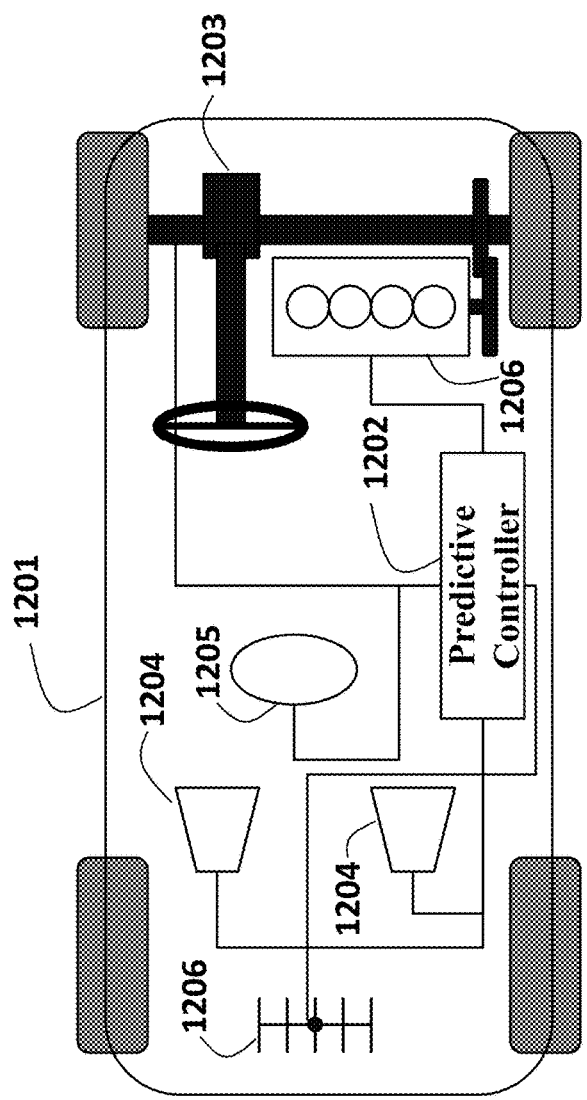
FIG. 12 is a schematic of a vehicle including a controller employing principles of some embodiments.

FIG. 12 shows a schematic of a vehicle 1201 including a predictive controller 1202 employing principles of some embodiments of the invention. As used herein, the vehicle 1201 can be any type of wheeled vehicle, such as a passenger car, bus, or rover. Also, the vehicle 1201 can be an autonomous or semi-autonomous vehicle. For example, some embodiments control the motion of the vehicle 1201. Examples of the motion include lateral motion of the vehicle controlled by a steering system 1203 of the vehicle 1201. In one embodiment, the steering system 1203 is controlled by the controller 1202. Additionally, or alternatively, the steering system 1203 can be controlled by a driver of the vehicle 1201.

The vehicle can also include an engine 1206, which can be controlled by the controller 1202 or by other components of the vehicle 1201. The vehicle can also include one or more sensors 1204 to sense the surrounding environment. Examples of the sensors 1204 include distance range finders, radars, lidars, and cameras. The vehicle 1201 can also include one or more sensors 1205 to sense its current motion quantities and internal status. Examples of the sensors 1205 include global positioning system (GPS), accelerometers, inertial measurement units, gyroscopes, shaft rotational sensors, torque sensors, deflection sensors, pressure sensor, and flow sensors. The sensors provide information to the controller 1202. The vehicle can be equipped with a transceiver 1206 enabling communication capabilities of the controller 1202 through wired or wireless communication channels.

Figure 13:
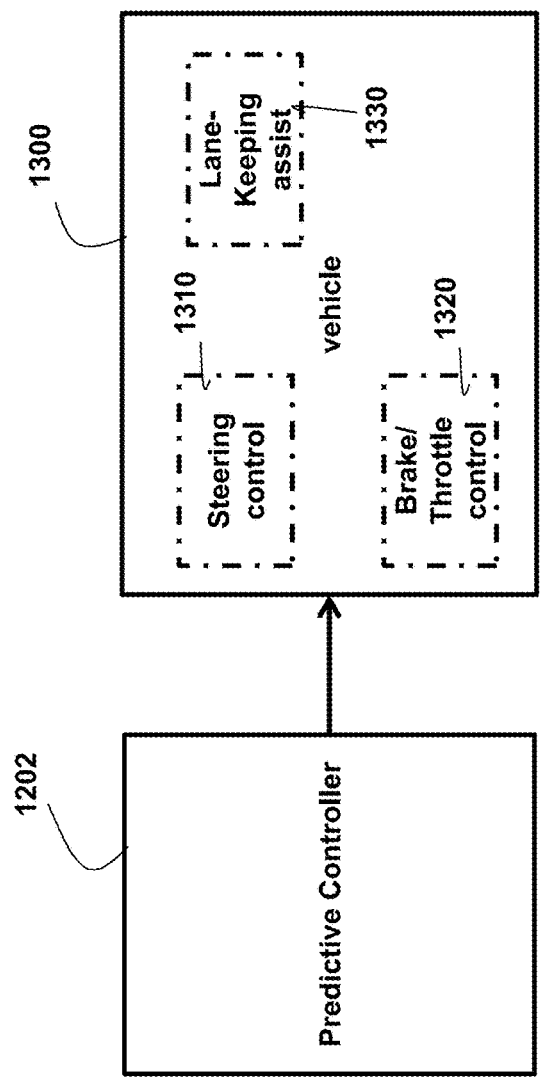
FIG. 13 is a schematic of interaction between the controller employing principles of some embodiments and controllers of the vehicle 1201 according to some embodiments.

FIG. 13 shows a schematic of interaction between the predictive controller 1202 and the controllers 1300 of the vehicle 1201 according to some embodiments. For example, in some embodiments, the controllers 1300 of the vehicle 1201 are steering 1310 and brake/throttle controllers 1320 that control rotation and acceleration of the vehicle 1300. In such a case, the predictive controller 1202 outputs control inputs to the controllers 1310 and 1320 to control the state of the vehicle. The controllers 1300 can also include high-level controllers, e.g., a lane-keeping assist controller 1330 that further process the control inputs of the predictive controller 1202. In both cases, the controllers 1300 maps use the outputs of the predictive controller 1202 to control at least one actuator of the vehicle, such as the steering wheel and/or the brakes of the vehicle, in order to control the motion of the vehicle.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A control system for controlling an operation of a system with continuous-time nonlinear dynamics subject to constraints including equality and inequality constraints on state and control variables of the system, comprising:

an estimator to estimate a current state of the system using measurements of the operation of the system;

a memory to store intermediate condensing matrices and an approximation of a constraint Jacobian matrix determined for each time interval in a control horizon, such that the intermediate condensing matrices and the approximation of the constraint Jacobian matrix have a block-bidiagonal structure;

a processor to iteratively solve, at each control step, an approximation of a constrained nonlinear optimization problem to produce a control solution, wherein the approximation includes a linearization of the nonlinear dynamics of the system discretized by time intervals in the control horizon and represented using the approximation of the constraint Jacobian matrix for each time interval of the control horizon, wherein, at each control step, the processor is configured to retrieve, from the memory, the intermediate condensing matrices and the approximation of the constraint Jacobian matrix determined for each time interval;

block-wise update the approximation of the constraint Jacobian matrix and the intermediate condensing matrices using an evaluation of one or combination of the discretized dynamics of the system and a directional derivative of the discretized dynamics of the system, wherein each block in the constraint Jacobian matrix and the intermediate condensing matrices represents one time interval in the control horizon;

solve the approximation of the nonlinear optimization problem using the updated approximation of the constraint Jacobian matrix; and update the memory with the updated approximation of the constraint Jacobian matrix and the updated intermediate condensing matrices; and a controller to control the system using the control solution.

2. The control system of claim 1, wherein the approximation of the nonlinear optimization problem includes a gradient correction that depends on a difference between the constraint Jacobian approximation and an exact constraint Jacobian matrix of the discretized dynamics of the system.

3. The control system of claim 2, wherein the approximation of the nonlinear optimization problem is a quadratic program (QP).

4. The control system of claim 1, wherein the block-wise update of approximation of the constraint Jacobian matrix and the intermediate condensing matrices is a block-wise rank-one update and wherein the rank-one update is defined by one or combination of an evaluation of the discretized dynamics of the system and at least one evaluation of a directional derivative of the discretized dynamics of the system.

5. The control system of claim 1, wherein the discretized dynamics of the system are based on an explicit integration to discretize a set of continuous-time nonlinear differential equations and wherein the approximation of the constraint Jacobian matrix is a Jacobian approximation of an explicit integration applied to the continuous-time dynamics in each time interval of the control horizon.

6. The control system of claim 1, wherein the discretized dynamics of the system are based on an implicit integration applied to the continuous-time system dynamics in each time interval of the control horizon, wherein the condensing matrices are function of Jacobian of equations including intermediate variables defined by an implicit system of nonlinear equations of the continuous-time nonlinear dynamics, and wherein the approximation of the constraint Jacobian matrix represents a combined system of the discretized dynamics and the implicit system of nonlinear equations for each time interval of the control horizon.

7. The control system of claim 6, wherein the processor numerically eliminates the intermediate variables from the approximation of the nonlinear optimization problem forming a condensed approximation of the nonlinear optimization problem with a block-wise rank-one update of the constraint Jacobian approximations.

8. The control system of claim 1, wherein the block-wise update is a rank-one update with at least one evaluation of the discretized dynamics of the system.

9. The control system of claim 1, wherein the block-wise update is a two-sided rank-one update with at least one evaluation of the discretized dynamics of the system and at least one evaluation of an adjoint directional derivative of the discretized dynamics of the system.

10. The control system of claim 1, wherein the processor computes a low-rank update of a factorization of a condensed Hessian of the approximation of the nonlinear optimization problem in response to the block-wise update of the approximation of the constraint Jacobian matrix and the intermediate condensing matrices.

11. The control system of claim 1, wherein the processor computes a symmetric rank-two update of a factorization of a condensed Hessian of the approximation of the nonlinear optimization problem in response to the block-wise update of the approximation of the constraint Jacobian matrix and the intermediate condensing matrices.

12. The control system of claim 1, wherein the processor computes a symmetric rank-three update of a factorization of a condensed Hessian of the approximation of the nonlinear optimization problem in response to the block-wise update of the approximation of the constraint Jacobian matrix and the intermediate condensing matrices, and in response to a rank-one update of an approximation of a Hessian matrix.

13. The control system of claim 1, wherein the system is a vehicle, and wherein the controller determines an input to the vehicle based on the control solution, wherein the input to the vehicle includes one or a combination of an acceleration of the vehicle, a torque of a motor of the vehicle, and a steering angle.

14. A method for controlling an operation of a system with continuous-time nonlinear dynamics subject to constraints including equality and inequality constraints on state and control variables of the system, wherein the method uses a processor coupled to a memory storing intermediate condensing matrices and an approximation of a constraint Jacobian matrix determined for each time interval in a control horizon, such that the intermediate condensing matrices and the approximation of the constraint Jacobian matrix have a block-bidiagonal structure, wherein the processor is coupled with stored instructions implementing the method, wherein the instructions, when executed by the processor carry out at least some steps of the method, comprising:

estimating a current state of the system using measurements of the operation of the system;

iteratively solving, at each control step, an approximation of a constrained nonlinear optimization problem to produce a control solution, wherein the approximation includes a linearization of the nonlinear dynamics of the system discretized by time intervals in the control horizon and represented using the approximation of the constraint Jacobian matrix for each time interval of the control horizon, wherein, an iteration of the solving comprises
- retrieving, from the memory, the intermediate condensing matrices and the approximation of the constraint Jacobian matrix determined for each time interval;
- block-wise updating the approximation of the constraint Jacobian matrix and the intermediate condensing matrices using an evaluation of one or combination of the discretized dynamics of the system and a directional derivative of the discretized dynamics of the system, wherein each block in the constraint Jacobian matrix and the intermediate condensing matrices represents one time interval in the control horizon;
- solving the approximation of the nonlinear optimization problem using the updated approximation of the constraint Jacobian matrix; and
- updating the memory with the updated approximation of the constraint Jacobian matrix and the updated intermediate condensing matrices; and controlling the system using the control solution.

15. A non-transitory computer readable storage medium embodied thereon a program executable by a processor for performing a method, the method comprising:
- estimating a current state of the system using measurements of the operation of the system;
- iteratively solving, at each control step, an approximation of a constrained nonlinear optimization problem to produce a control solution, wherein the approximation includes a linearization of the nonlinear dynamics of the system discretized by time intervals in the control horizon and represented using the approximation of the constraint Jacobian matrix for each time interval of the control horizon, wherein, an iteration of the solving comprises
  - retrieving intermediate condensing matrices and an approximation of a constraint Jacobian matrix determined for each time interval in a control horizon, such that the intermediate condensing matrices and the approximation of the constraint Jacobian matrix have a block-bidiagonal structure;
  - block-wise updating the approximation of the constraint Jacobian matrix and the intermediate condensing matrices using an evaluation of one or combination of the discretized dynamics of the system and a directional derivative of the discretized dynamics of the system, wherein each block in the constraint Jacobian matrix and the intermediate condensing matrices represents one time interval in the control horizon; and
  - solving the approximation of the nonlinear optimization problem using the updated approximation of the constraint Jacobian matrix; and
- controlling the system using the control solution.

* * * * *